US007405752B2

(12) United States Patent
Kondo et al.

(10) Patent No.: US 7,405,752 B2
(45) Date of Patent: Jul. 29, 2008

(54) MOBILE COMMUNICATION SYSTEM, MOBILE COMMUNICATION TERMINAL AND PROGRAM THEREOF FOR DISPLAYING VIDEO AT DESIRED POSITIONS

(75) Inventors: Daisuke Kondo, Tokyo (JP); Kazuya Anzawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 732 days.

(21) Appl. No.: 10/824,858

(22) Filed: Apr. 14, 2004

(65) Prior Publication Data

US 2004/0257440 A1  Dec. 23, 2004

(30) Foreign Application Priority Data

Apr. 14, 2003 (JP) .......................... P2003-109367

(51) Int. Cl.
*H04N 5/228* (2006.01)

(52) U.S. Cl. .............................. 348/222.1; 348/207.99; 348/150; 348/155; 348/169; 455/557; 455/566; 455/456.1; 455/456.6; 375/240; 375/240.25

(58) Field of Classification Search ................ 382/100, 382/233, 284, 176; 707/3, 104.1; 713/176; 375/240.1, 240.25; 348/94, 180, 207.9, 143, 348/169; 455/566, 456.1, 457, 456.6
See application file for complete search history.

(56) References Cited

U.S. PATENT DOCUMENTS 6,008,492 A * 12/1999 Slater et al. ................. 250/334
6,140,943 A * 10/2000 Levine .................... 340/995.12
7,010,144 B1 * 3/2006 Davis et al. ................. 382/100
2002/0126914 A1 * 9/2002 Kotake et al. ............... 382/282
2004/0107181 A1 * 6/2004 Rodden ......................... 707/1
2004/0130620 A1 * 7/2004 Buehler et al. .............. 348/143
2006/0256852 A1 * 11/2006 Prakash et al. ......... 375/240.01

FOREIGN PATENT DOCUMENTS

| CN | 1413026 A | 4/2003 |
| JP | H09-200666 A | 7/1997 |
| JP | H10-132595 A | 5/1998 |
| JP | H10-150625 A | 6/1998 |
| JP | 2000-304559 A | 11/2000 |
| JP | 2002-199320 A | 7/2002 |

* cited by examiner

*Primary Examiner*—Vincent P. Harper
*Assistant Examiner*—Dung Lam
(74) *Attorney, Agent, or Firm*—Brinks Hofer Gilson & Lione

(57) ABSTRACT

In a mobile communication terminal 10, a position information assigning section 24 associates images acquired by the photographing section 20 with position information concerning the positions at which these images are acquired. A video generating section 30 generates, by using the images, a video including frames associated with the position information. A video searching section 70 specifies the frame of the video associated with position information, which is close to the position information acquired by a position detecting section 22. A playback section 72 displays the specified frame.

3 Claims, 23 Drawing Sheets

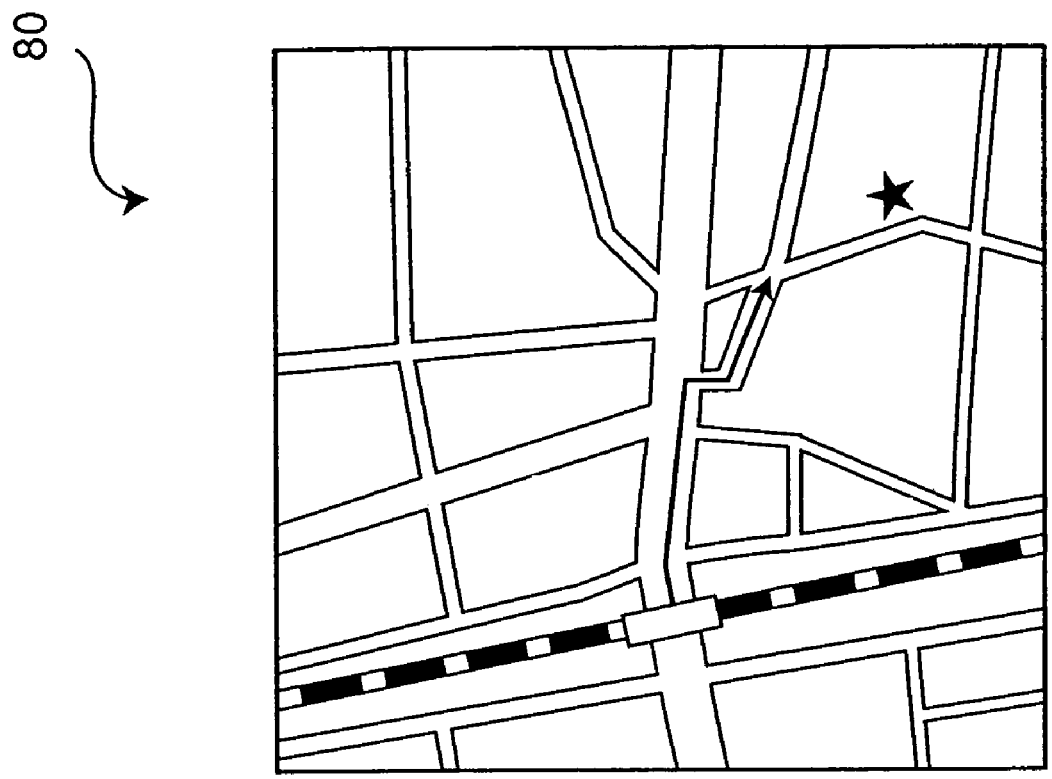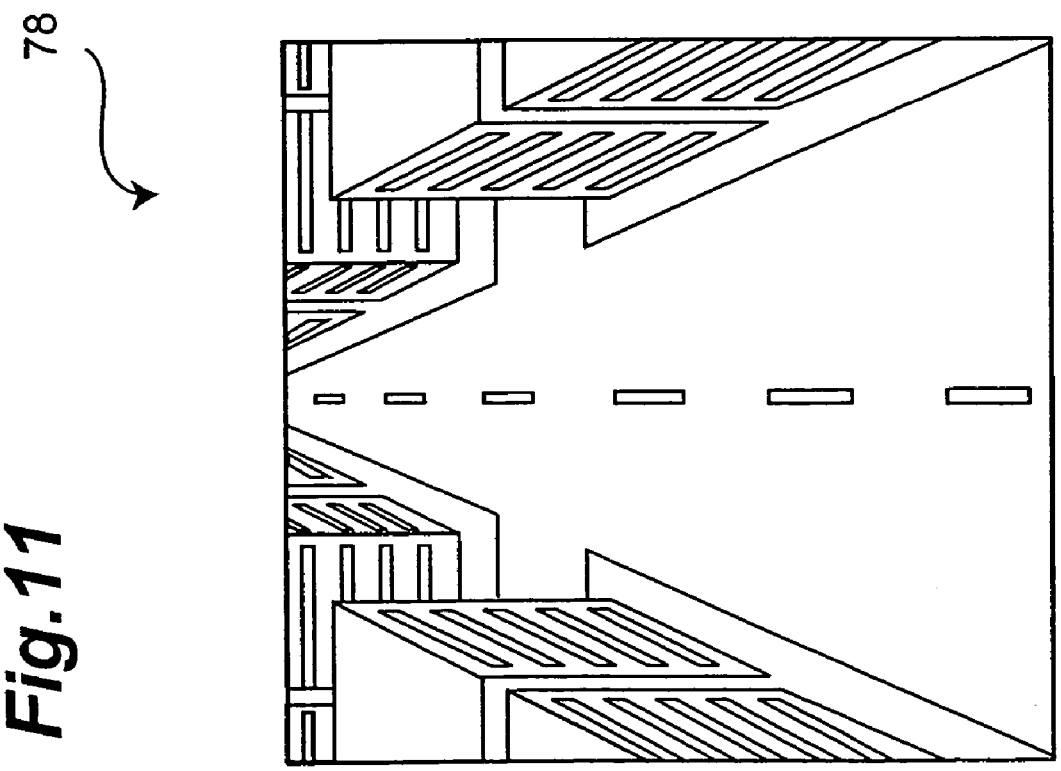
Fig.11

MOBILE COMMUNICATION SYSTEM, MOBILE COMMUNICATION TERMINAL AND PROGRAM THEREOF FOR DISPLAYING VIDEO AT DESIRED POSITIONS

BACKGROUND OF THE INVENTION

1. Field of the Invention

The present invention relates to mobile communication systems, mobile communication terminals and programs thereof. More particularly, the present invention relates to mobile communication systems, mobile communication terminals and programs which provide navigation service to the user of the mobile communication terminal by using video.

2. Related Background of the Invention

Technologies in such field include a various types of navigation apparatuses. One type of such navigation apparatuses is a navigation apparatus in which a video acquired by a camera, which is associated with specified points, such as intersections, on a map, are pre-stored and the video associated with the points on the map are displayed on the basis of position information acquired by GPS (Global Positioning System) (e.g. Japanese Patent Application Laid-open No. 2000-304559). Namely, this navigation apparatus provides route guidance service by displaying a video photographed around the current position thereof.

SUMMARY OF THE INVENTION

However, since the above-described navigation apparatus associates the video with specific points, such as intersections, on the map, the video is associated with coarse position information. Accordingly, at actual positions of the apparatus, a video which are different from the scenes around the positions are displayed, which is problematic.

The present invention, for solving the above problem, provides mobile communication system, mobile communication terminals and programs capable of displaying a video of scenes at desired positions.

In order to solve the above problem, a mobile communication system of the present invention comprises a first mobile communication terminal and a second communication terminal. The first mobile communication terminal comprises: first position information acquiring means for acquiring position information; photographing means for acquiring images of field; position information assigning means for associating each of the images, which are acquired by the photographing means in a predetermined time interval, with the position information which is acquired by the first position information acquiring means and specifies the position at which the image is acquired; video generating means for generating a video including frames each associated with the position information concerning the acquired position, based on a plurality of images which are photographed by the photographing means and include the images each associated with the position information by the position information assigning means; storage means for storing the video generated by the video generating means and items of the position information which are associated with the frames included in the video; and transmitting means for transmitting the video and the items of position information associated with the frames included in the video, which are stored in the storage means. The second mobile communication terminal comprises: receiving means for receiving the video and items of the position information associated with the frames of the video which are transmitted from the first mobile communication terminal; second position information acquiring means for acquiring position information; searching means for specifying, among the position information received by the receiving means, the position information corresponding to the position information acquired by the second position information acquiring means to specify the frame of the video associated with the specified position information; and playback means for displaying the frame of the video specified by the searching means.

Further, a mobile communication terminal of the present invention corresponds to the first mobile communication terminal of the mobile communication system according to the above-described invention. The mobile communication terminal comprises: position information acquiring means for acquiring position information; photographing means for acquiring images of field; position information assigning means for associating each of the images, which are acquired by the photographing means in a predetermined time interval, with the position information which is acquired by the position information acquiring means and specifies the position at which the image is acquired; video generating means for generating a video including frames each associated with the position information concerning the acquired position, based on a plurality of images which are photographed by the photographing means and include the images each associated with the position information by the position information assigning means; storage means for storing the video generated by the video generating means and items of the position information which are associated with the frames included in the video; and transmitting means for transmitting the video and the items of position information associated with the frames included in the video, which are stored in the storage means.

Further, a mobile communication terminal of the present invention corresponds to the second mobile communication terminal of the mobile communication system according to the above-described invention. The mobile communication terminal comprises: receiving means for receiving a video which includes frames each associated with position information for specifying the acquired position, and items of the position information; position information acquiring means for acquiring position information; searching means for specifying, among the items of position information received by the receiving means, the position information corresponding to the position information acquired by the position information acquiring means to specify the frame of the video associated with the specified position information; and playback means for displaying the frame of the video specified by the searching means.

In accordance with the inventions, the mobile communication system comprises the first mobile communication terminal and the second mobile communication terminal. In the first mobile communication terminal, each images acquired by the photographing means in a predetermined time interval is associated with position information concerning the position at which the image is acquired. Then, the video generating means generates, from a plurality of images including images each associated with the position information, a video including frames each associated with the position information. The video is transmitted by the transmitting means to the second mobile communication terminal. In the second mobile communication terminal, the playback means displays the frame associated with the position information corresponding to the position information acquired by the second position information acquiring means. Thus, in the first mobile communication terminal, the video including frames each associated with the position information concerning the position at which the frame is acquired. Therefore, the first mobile communication terminal can generate a video including frames each associated with position information, which is little deviated from the position at which the frame is acquired. Further, in the second mobile communication terminal, a frame specified on the basis of position information acquired by the second position information acquiring means is displayed. Therefore, the second mobile communication terminal can display, at a current position thereof, a video concerning the scene neighboring the position.

In order to solve the above problem, a mobile communication system of the present invention comprises a first mobile communication terminal and a second mobile communication terminal. The first mobile communication terminal comprises: first position information acquiring means for acquiring position information; photographing means for acquiring images of field; position information assigning means for associating each of the images, which are acquired by the photographing means in a predetermined time interval, with the position information which is acquired by the first position information acquiring means and specifies the position at which the image is acquired; video generating means for generating a video including frames each associated with the position information concerning the acquired position, based on a plurality of images which are photographed by the photographing means and include the images each associated with the position information by the position information assigning means; storage means for storing the video generated by the video generating means and items of the position information which are associated with the frames included in the video; and transmitting means for transmitting the video and the items of position information associated with the frames included in the video, which are stored in the storage means. The second mobile communication terminal comprises: receiving means for receiving the video and items of the position information associated with the frames of the video which are transmitted from the first mobile communication terminal; playback means for displaying the video received by the receiving means; and map display means for displaying two-dimensional map information and displaying, by superimposing on the two-dimensional map information, a travel locus based on the items of position information associated with the frames of the video displayed by the playback means.

Further, a mobile communication terminal of the present invention corresponds to the second mobile communication terminal of the mobile communication system according to the above-described invention. The mobile communication terminal comprises: receiving means for receiving a video which includes frames each associated with position information for specifying the acquired position, and items of the position information; playback means for displaying the video received by the receiving means; and map display means for displaying two-dimensional map information and displaying, by superimposing on the two-dimensional map information, a travel locus based on the items of position information associated with the frames of the video displayed by the playback means.

In accordance with the above inventions, the mobile communication system comprises a first mobile communication terminal and a second mobile communication terminal. In the first mobile communication terminal, each images acquired by the photographing means in a predetermined time interval is associated with position information concerning the position at which the image is acquired. Then, the video generating means generates, from a plurality of images including images each associated with position information, a video including frames each associated with position information. The video is transmitted by the transmitting means to the second mobile communication terminal. In the second mobile communication terminal, the playback means displays the video, and the map display means displays two-dimensional map information and a travel locus superimposed thereon, the travel locus being based on items of the position information associated with the frames being displayed. Therefore, the first mobile communication terminal can generate a video including frames each associated with position information, which is little deviated from the position at which the frame is acquired. Further, in the second mobile communication terminal, the map display means displays, by superimposing onto two-dimensional map information, a travel locus based on the items of position information associated with the frames being displayed. Therefore, the second mobile communication terminal can provide information concerning position on two-dimensional map and a video of scenes around the position.

In order to solve the above problem, a mobile communication terminal of the present invention comprises: position information acquiring means for acquiring position information; photographing means for acquiring images of field; position information assigning means for associating each of the images, which are acquired by the photographing means in a predetermined time interval, with the position information which is acquired by the position information acquiring means and specifies the position at which the image is acquired; video generating means for generating a video including frames each associated with the position information concerning the acquired position, based on a plurality of images which are photographed by the photographing means and include the images each associated with the position information by the position information assigning means; storage means for storing the video generated by the video generating means and items of the position information which are associated with the frames included in the video; searching means for specifying, among the items of position information stored in the storage means, the position information corresponding to the position information acquired by the position information acquiring means to specify the frame of the video associated with the specified position information; and playback means for displaying the frame of the video specified by the searching means.

In the mobile communication terminal according to this invention, each images acquired by the photographing means in a predetermined time interval is associated with position information concerning the position at which the image is acquired. Then, the video generating means generates, from a plurality of images including images each associated with the position information, a video including frames each associated with the position information. Then, the playback means displays the frame of the video associated with the position information acquired by the position information acquiring means. Thus, the mobile communication terminal according to the present invention is capable of generating a video including frames each associated with the position information, which is little deviated from the position at which the frame is acquired. Further, the mobile communication terminal according to the present invention can display frame specified on the basis of position information acquired by the position information acquiring means and therefore can display, at a current position thereof, a video concerning the scenes neighboring the position.

In order to solve the above problem, a mobile communication terminal of the present invention comprises: position information acquiring means for acquiring position information; photographing means for acquiring images of field; position information assigning means for associating each of the images, which are acquired by the photographing means in a predetermined time interval, with the position information which is acquired by the position information acquiring means and specifies the position at which the image is acquired; video generating means for generating a video including frames each associated with the position information concerning the acquired position, based on a plurality of images which are photographed by the photographing means and include the images each associated with the position information by the position information assigning means; storage means for storing the video generated by the video generating means and items of the position information which are associated with the frames included in the video; playback means for displaying the video stored in the storage means; and map display means for displaying two-dimensional map information and displaying, by superimposing onto the two-dimensional map information, a travel locus based on the position information associated with frames of the video displayed by the playback means.

In the mobile communication terminal according to this invention, each images acquired by the photographing means in a predetermined time interval is associated with position information concerning the position at which the image is acquired. Then, the video generating means generates, from a plurality of images including images each associated with the position information, a video including frames each associated with the position information. Then, the playback means displays the video and the map display means displays, by superimposing onto two-dimensional map information, a travel locus based on items of the position information associated with frames of the video being played back. Thus, the present invention provides a mobile communication terminal capable of generating a video including frames each associated with the position information which is little deviated from the position at which the frame is acquired. Further, since the map display means displays, by superimposing onto two-dimensional map information, a travel locus based on the items of position information associated with frames of a video being displayed by the playback means, this mobile communication terminal can provide information concerning position on a two-dimensional map and a video concerning the scenes around the position to the user.

Preferably, the abovementioned mobile communication terminals provided with the video generating means further comprises a frame rate adjusting means. The frame rate adjusting means adjusts the frame rate of the video, based on a plurality of images acquired by the photographing means including the images each associated with the position information by the position information assigning means. The frame rate adjusting means rate adjusting means divides the plurality of images into a plurality of groups including a predetermined number of images based on the order in which the images are acquired. The frame rate adjusting means determines, for each of the groups, direction information indicating the direction of a travel locus based on the position information associated with the predetermined number of images in the corresponding group. The frame rate adjusting means sets, for each of the groups, a frame rate for the video based on the predetermined number of images in the corresponding group to a first frame rate when a direction change amount based on the direction information determined for the corresponding group and the direction information determined for at least one of the previous group and the next group is larger than a predetermined amount, and sets the frame rate to a second frame rate lower than the first frame rate when the direction change amount is equal to or smaller than the predetermined amount. Further, the video generating means generates the video using the plurality of images, according to the frame rate determined for each of the plurality of groups.

In the mobile communication terminal structured as above, if there is no large direction change around the photographed position on the basis of the travel locus, the frame rate adjusting means sets a low frame rate for the video to be generated from images acquired around this position. Thus, the mobile communication terminal can generate a video having a low frame rate for areas including no large direction change and therefore no significant change in scenes within the field, thereby having reduced capacities.

Preferably, a mobile communication terminal provided with the video generating means further comprises second transmitting means and receiving means. The second transmitting means transmits the video generated by the video generating means and the items of position information associated with the frames of the video to a server. The server is a server which adjusts a frame rate of the video generated by the video generating means. The server divides the plurality of images included in the video into a plurality of groups including a predetermined number of images based on the order in which the images are acquired, and determine, for each of the groups, direction information indicating the direction of a travel locus based on the position information associated with the predetermined number of images in the corresponding group. The server further changes, for each of the groups, a frame rate of the video based on the predetermined number of images in the corresponding group to a first frame rate when a direction change amount based on the direction information determined for the corresponding group and the direction information determined for at least one of the previous group and the next group is larger than a predetermined amount, and changes the frame rate of the video to a second frame rate lower than the first frame rate when the direction change amount is equal to or smaller than the predetermined amount. The receiving means receives the video with frame rates adjusted by the server and the items of position information associated with frames of the video, and then stores the video and the items of position information in the storage means.

In the mobile communication terminal structured as above, the second transmitting means transmits to the server a video and the position information associated therewith, and then receives the video of which frame rates are adjusted by the server. The server sets, for sections in which there is no large direction change based on the travel locus around the positions at which images are acquired, a low frame rate for the video of the positions. Thus, the mobile communication terminal structured as above can generate a video having a low frame rate for sections including no large direction change and therefore no significant change in scenes within the field, thereby having reduced capacities.

Preferably, in the mobile communication terminal in which the video is displayed, the playback means refers to a travel locus based on the position information associated with frames of the video and displays a symbol indicating the direction of travel based on the travel locus.

The mobile communication terminal structured as above superimposes, onto a video, a predetermined symbol indicating the direction of travel, and therefore can provide convenient route guidance service to the user of the mobile communication terminal.

In order to solve the above problem, a program according to the present invention causes a mobile communication terminal to operate as: position information acquiring means for acquiring position information; photographing means for acquiring images of field; position information assigning means for associating each of the images, which are acquired by the photographing means in a predetermined time interval, with the position information which is acquired by the position information acquiring means and specifies the position at which the image is acquired; video generating means for generating a video including frames each associated with the position information concerning the acquired position, based on a plurality of images which are photographed by the photographing means and include the images each associated with the position information by the position information assigning means and for storing the video and items of the position information associated with the frames of the video in a storage means; and transmitting means for transmitting the video and the items of position information associated with the frames included in the video, which are stored in the storage means.

The program structured as above causes a mobile communication terminal to operate as the position information acquiring means, the photographing means, the position information assigning means, the video generating means and the transmitting means as described above. Therefore, the mobile communication terminal, which is operated according to the program, can generate a video including frames each associated with position information, which is little deviated from the position at which the frame is acquired.

In order to solve the above problem, a program according to the present invention causes a mobile communication terminal to operate as: receiving means for receiving a video which includes frames each associated with position information for specifying the acquired position, and items of the position information; position information acquiring means for acquiring position information; searching means for specifying, among the items of position information received by the receiving means, the position information corresponding to the position information acquired by the position information acquiring means to specify the frame of the video associated with the specified position information; and playback means for displaying the frame of the video specified by the searching means.

The program structured as above causes a mobile communication terminal to operate as the receiving means, the position information acquiring means, the searching means and the playback means as described above. Therefore, the mobile communication terminal which is operated according to the program can displays, at its current position, a video concerning the scenes neighboring the position.

In order to solve the above problem, a program according to the present invention causes a mobile communication terminal to operate as: receiving means for receiving a video which includes frames each associated with position information for specifying the acquired position, and items of the position information; playback means for displaying the video received by the receiving means; and map display means for displaying two-dimensional map information and displaying, by superimposing on the two-dimensional map information, a travel locus based on the items of position information associated with the frames of the video displayed by the playback means.

The program structured as above causes a mobile communication terminal to operate as the receiving means, the playback means and the map display means as described above. Therefore, the mobile communication terminal, which is operated according to the program, can provide information concerning position on a two-dimensional map and a video of scenes around the position.

In order to solve the above problem, a program according to the present invention causes a mobile communication terminal to operate as: position information acquiring means for acquiring position information; photographing means for acquiring images of field; position information assigning means for associating each of the images, which are acquired by the photographing means in a predetermined time interval, with the position information which is acquired by the position information acquiring means and specifies the position at which the image is acquired; video generating means for generating a video including frames each associated with the position information concerning the acquired position, based on a plurality of images which are photographed by the photographing means and include the images each associated with the position information by the position information assigning means, and for storing the video and items of the position information associated with the frames of the video in a storage means; searching means for specifying, among the items of position information stored in the storage means, the position information corresponding to the position information acquired by the position information acquiring means to specify the frame of the video associated with the specified position information; and playback means for displaying the frame of the video specified by the searching means.

The program structured as above causes a mobile communication terminal to operate as the position information acquiring means, the photographing means, the position information assigning means, the video generating means, and the searching means and the playback means as described above. Therefore, the mobile communication terminal, which is operated according to the program, can generate a video including frames each associated with position information, which is little deviated from the position at which the frame is acquired. The mobile communication terminal which is operated according to the program can also display, at its current position, a video concerning the scenes neighboring the position.

In order to solve the above problem, a program according to the present invention causes a mobile communication terminal to operate as: position information acquiring means for acquiring position information; photographing means for acquiring images of field; position information assigning means for associating each of the images, which are acquired by the photographing means in a predetermined time interval, with the position information which is acquired by the position information acquiring means and specifies the position at which the image is acquired; video generating means for generating a video including frames each associated with the position information concerning the acquired position, based on a plurality of images which are photographed by the photographing means and include the images each associated with the position information by the position information assigning means, and for storing the video and items of the position information associated with the frames of the video in a storage means; playback means for displaying the video stored in the storage means; and map display means for displaying two-dimensional map information and displaying, by superimposing onto the two-dimensional map information, a travel locus based on the position information associated with respective frames of the video being displayed by the playback means.

The program structured as above causes a mobile communication terminal to operate as the position information acquiring means, the photographing means, the position information assigning means, the video generating means, the playback means and the map display means as described above. Therefore, the mobile communication terminal, which is operated according to the program, can generate a video including frames each associated with position information, which is little deviated from the position at which the frame is acquired. The mobile communication terminal which is operated according to the program can also display, on two-dimensional map information, a travel locus based on the position information each associated with the frame of the video by the map display means, and therefore can provide information concerning position on a two-dimensional map and a video concerning the scenes around the position.

The present invention will be more fully understood from the detailed description given hereinbelow and the attached drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the course of the following detailed description, reference will be made to the attached drawings in which:

FIG. 11 is a view illustrating an example of a picture being displayed by the playback section according to the embodiment and an example of a picture being displayed by the map display section according to the embodiment;

DESCRIPTION OF THE PREFERRED EMBODIMENTS

A mobile communication system 1 according to an embodiment of the present invention will now be explained with reference to the accompanying drawings. In the description hereinafter, identical or equivalent portions will be denoted by the same reference symbols throughout the drawings, for easier understanding of the description.

Figure 1:
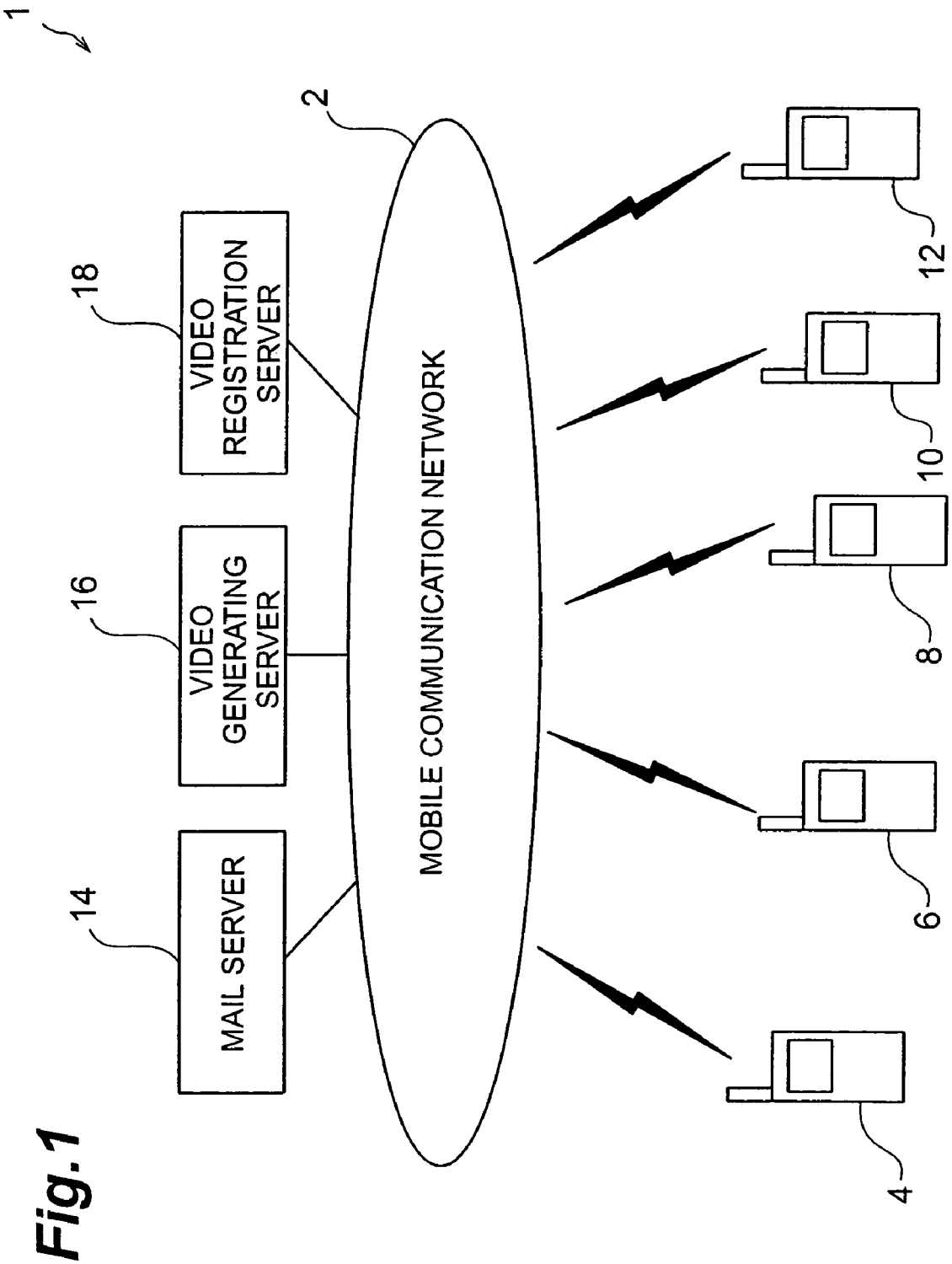
FIG. 1 is a view illustrating the structure of the mobile communication system according to an embodiment.

FIG. 1 is a view illustrating the structure of the mobile communication system according to an embodiment. The mobile communication system 1 shown in FIG. 1 according to this embodiment includes a mobile communication terminal 4, a mobile communication terminal 6, a mobile communication terminal 8, a mobile communication terminal 10, a mobile communication terminal 12, a mail server 14, a video generating server 16 and a video registration server 18. The mobile communication terminal 4, the mobile communication terminal 6, the mobile communication terminal 8, the mobile communication terminal 10, the mobile communication terminal 12, the mail server 14, the video generating server 16 and the video registration server 18 are each connected to a mobile communication network 2.

Next, the mobile communication terminal 4 will now be explained. The mobile communication terminal 4 is an information communication terminal, such as a cellular phone, which is carried by a user. The mobile communication terminal 4 physically includes a CPU (central processing unit), a storage device, a display device such as a display, and an input device such as push buttons, a communication device, a camera and the like.

Figure 2:
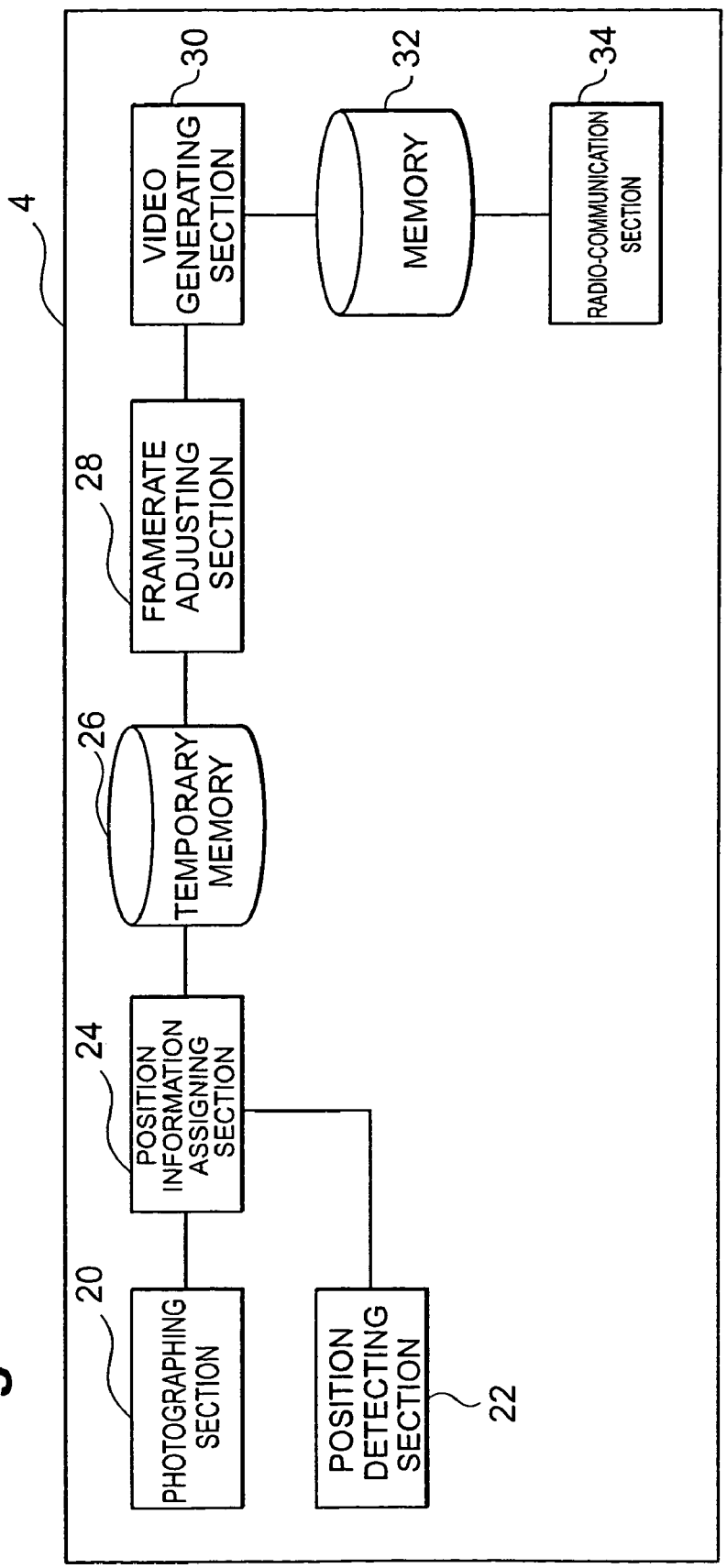
FIG. 2 is a block diagram illustrating the functional structure of a mobile communication terminal according to the embodiment.

FIG. 2 is a block diagram illustrating the functional structure of the mobile communication terminal 4. The mobile communication terminal 4 functionally includes a photographing section (photographing means) 20, a position detecting section (position information acquiring means) 22, a position information assigning section (position information assigning means) 24, a temporary storage section 26, a frame rate adjusting section (frame rate adjusting means) 28, a video generating section (video generating means) 30, a storage section (storage means) 32, and a radio-communication section (transmitting means) 34.

Figure 3:
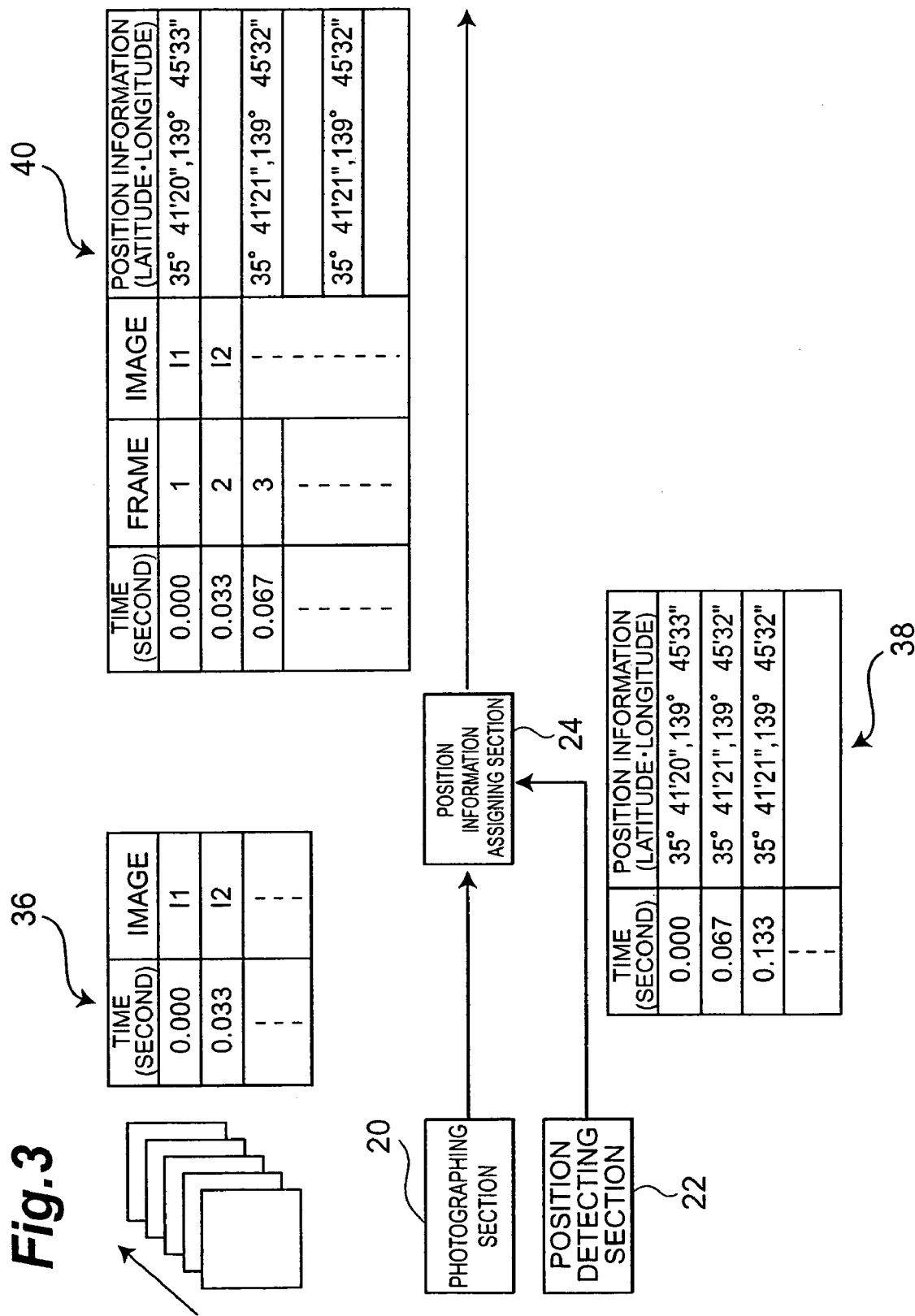
FIG. 3 is a view illustrating the data flow in the mobile communication terminal according to the embodiment.
Figure 4:
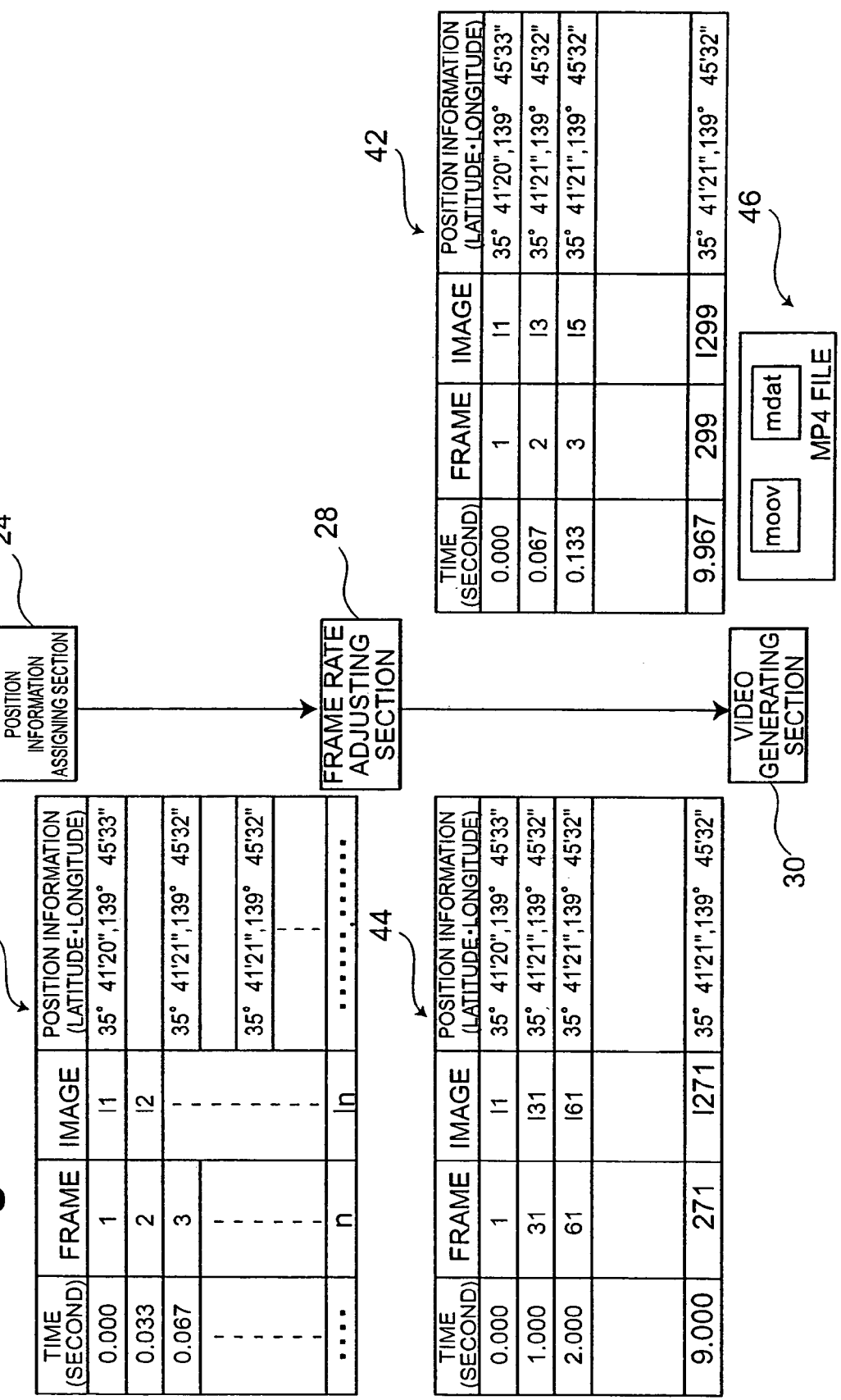
FIG. 4 is a view illustrating the data flow in the mobile communication terminal according to the embodiment.

The photographing section 20 acquires images of field, at current positions of the mobile communication terminal 4. The photographing section 20 carries out this function with a camera provided on the above-described mobile communication terminal 4. FIGS. 3 and 4 are views illustrating the data flow in the mobile communication terminal 4. As illustrated in FIG. 3, the photographing section 20 acquires images at current positions of the mobile communication terminal 4, while being carried by a user of the mobile communication terminal 4 (reference numeral 36). The photographing section 20 acquires images at a rate of 30 frames per second.

The position detecting section 22 acquires items of position information concerning current positions of the mobile communication terminal 4. Such position information can be acquired through GPS (Global Positioning System) and includes latitude and longitude information acquired by GPS (Global Positioning System), as represented by the reference numeral 38 in FIG. 3. The position detecting section 22 acquires position information, for example, at a rate of 15 times per second.

Returning to FIG. 2, the position information assigning section 24 associates each images, which are acquired by the photographing section 20 at a predetermined time interval, with position information concerning the position at which the image is acquired. The position information which is associated with the image acquired by the photographing section 20 is position information acquired by the position detecting section 22. The position information assigning section 24 stores the images associated with items of the position information in the temporary storage section 26. The temporary storage section 26 can be realized by a storage device such as, for example, RAM (Random Access Memory). In FIG. 3, the reference numeral 40 represents data including the images and the items of position information associated therewith by the position information assigning section 24. The position detecting section 22 and the photographing section 20 obtain the items of position information and images respectively at different rates, and therefore when images are acquired at the same time as position information, these images can be associated with corresponding position information as shown in FIG. 3. Also, images may be associated with position information acquired at the nearest time.

Figure 5:
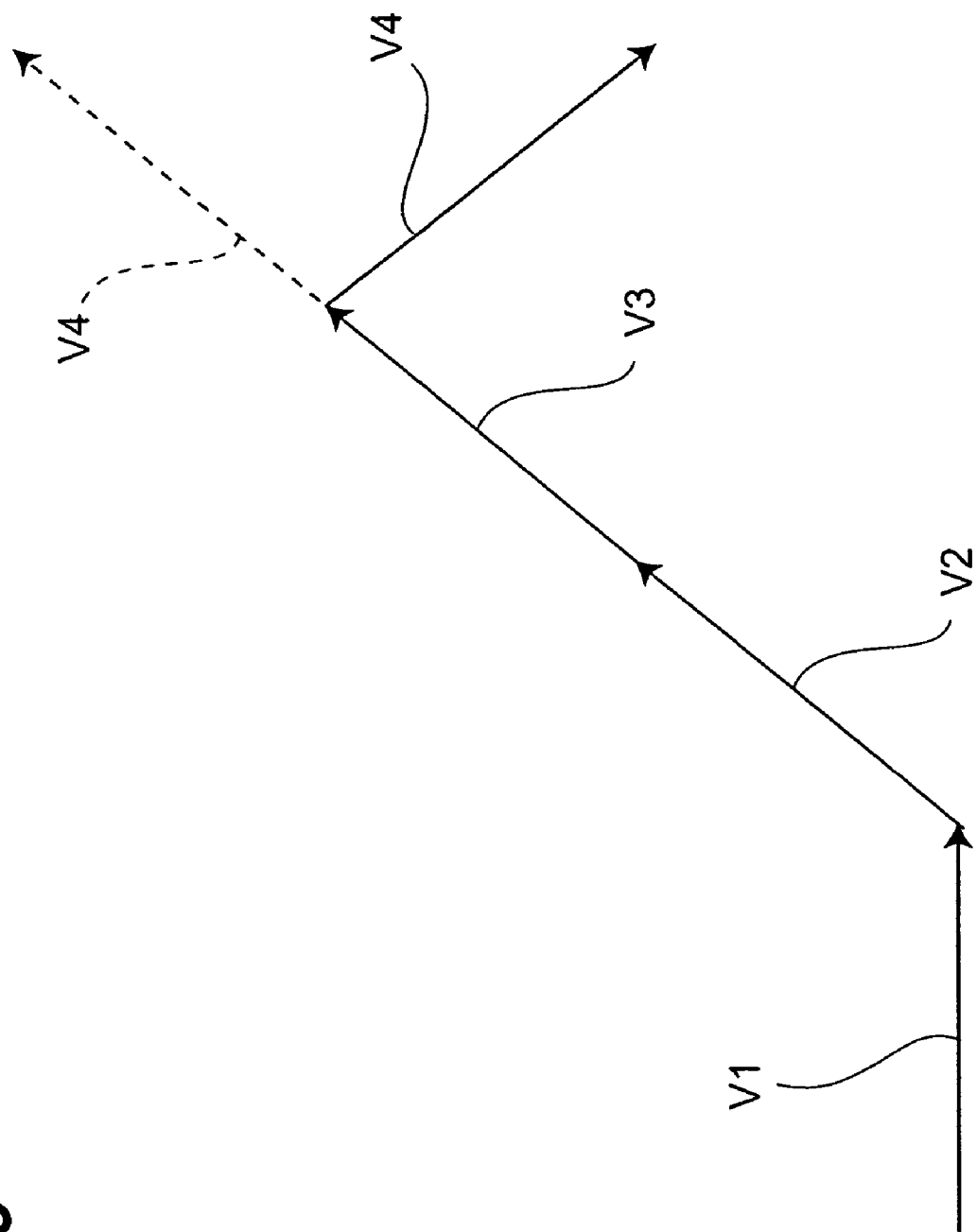
FIG. 5 is a drawing for explanation of the concept of the process which is performed by the frame rate adjusting section according to the embodiment.

Returning to FIG. 2, the frame rate adjusting section 28 determines the frame rate of a video to be generated by the video generating section 30 by the use of images stored in the temporary storage section 26, which will be explained later. FIG. 5 is a drawing for explanation of the concept of the process, which is executed by the frame rate adjusting section 28. Referring to FIG. 5, the frame rate adjusting section 28 divides the plurality of images stored in the temporary storage section 26 into groups containing predetermined number of images. The frame rate adjusting section 28 determines a direction information with respect to each of the groups. The direction information is determined from a travel locus based on the items of position information associated with images in corresponding group. In FIG. 5, V1, V2, V3, and V4 show each direction information for the corresponding groups. The "predetermined number" may be, for example, the number of images acquired per 10 seconds.

The frame rate adjusting section 28 calculates an angle between a vector base on the direction information determined for the processing target group and a vector base on the direction information determined for the next group. When the angle is equal to or less than a predetermined angle, the frame rate adjusting section 28 determines the direction change for the processing target group is small. The "predetermined angle" may be 45 degree, for example. When the frame rate adjusting section 28 determines that the direction change for the processing target group is small, it sets the frame rate for a video generated from the images included in the processing target group to a low value. In the example shown in FIG. 5, the vector of direction information V1 of the first 10 seconds and the vector of direction information V2 of the next 10 seconds form an angle of more than 45 degree, and therefore the frame rate adjusting section 28 determines that the direction change is large and sets the frame rate for the group corresponding to the direction information V1 to a high value. This high value may be, for example, 15 frames per second, as represented by the reference numeral 42 in FIG. 4.

Returning to FIG. 5, next, since the vector of direction information V2 and the vector of direction information V3 of the next 10 seconds form an angle of less than 45 degree, the frame rate adjusting section 28 determines that the direction change is small. However, since the frame rate adjusting section 28 has determined that the previous direction change is large, it sets a high frame rate for the group corresponding to the direction information V2. Next, the vector of direction information V3 and the vector of the direction information V4, indicated by the solid line, of the next 10 seconds form an angle of the direction change is of more than 45 degree, and therefore the frame rate adjusting section 28 determines that the direction change is large and sets a high frame rate for the group corresponding to the direction information V3. On the other hand, in the case of the direction information V4 indicated by the broken line, the vector of direction information V3 and the vector of direction information V4 form an angle equal to or less than 45 degree, and the frame rate adjusting section 28 judges that the direction change is small. Also, the previous direction change is small, and therefore the frame rate adjusting section 28 sets a low frame rate for the group corresponding to the direction information V3. This low frame rate may be, for example, 1 frame per second, as represented by the reference numeral 44 in FIG. 4.

Returning to FIG. 2, the video generating section 30 generates a video using a plurality of images being stored in the temporary storage section 26. The frame rate of the video is set according to the frame rates determined by the frame rate adjusting section 28. The video generating section 30 associates each of the frames of the video with the position information concerning the position where the frame is acquired. Among the items of position information associated with the respective images stored in the temporary storage section 26, the position information associated with the images which correspond to the respective frames of the above video is associated with the frames of the video. The video generating section 30 generates a video file using the generated video and the position information associated with the respective frames thereof, and stores the video file in the storage section 32. The storage section 32 is constructed in a storage device of the mobile communication terminal 4.

Figure 6:
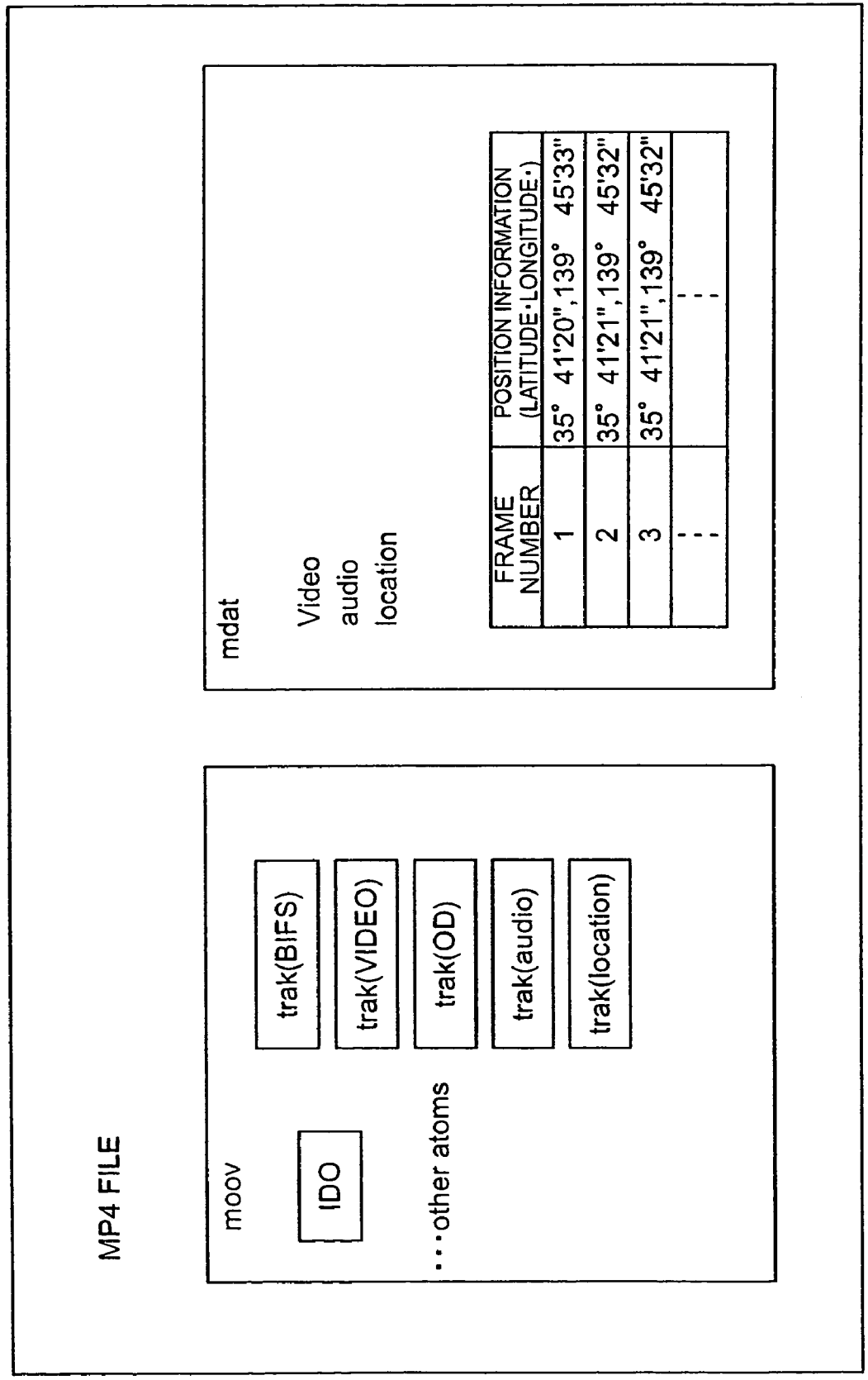
FIG. 6 is a view illustrating the structure of a MP4 file according to the embodiment.
Figure 7:
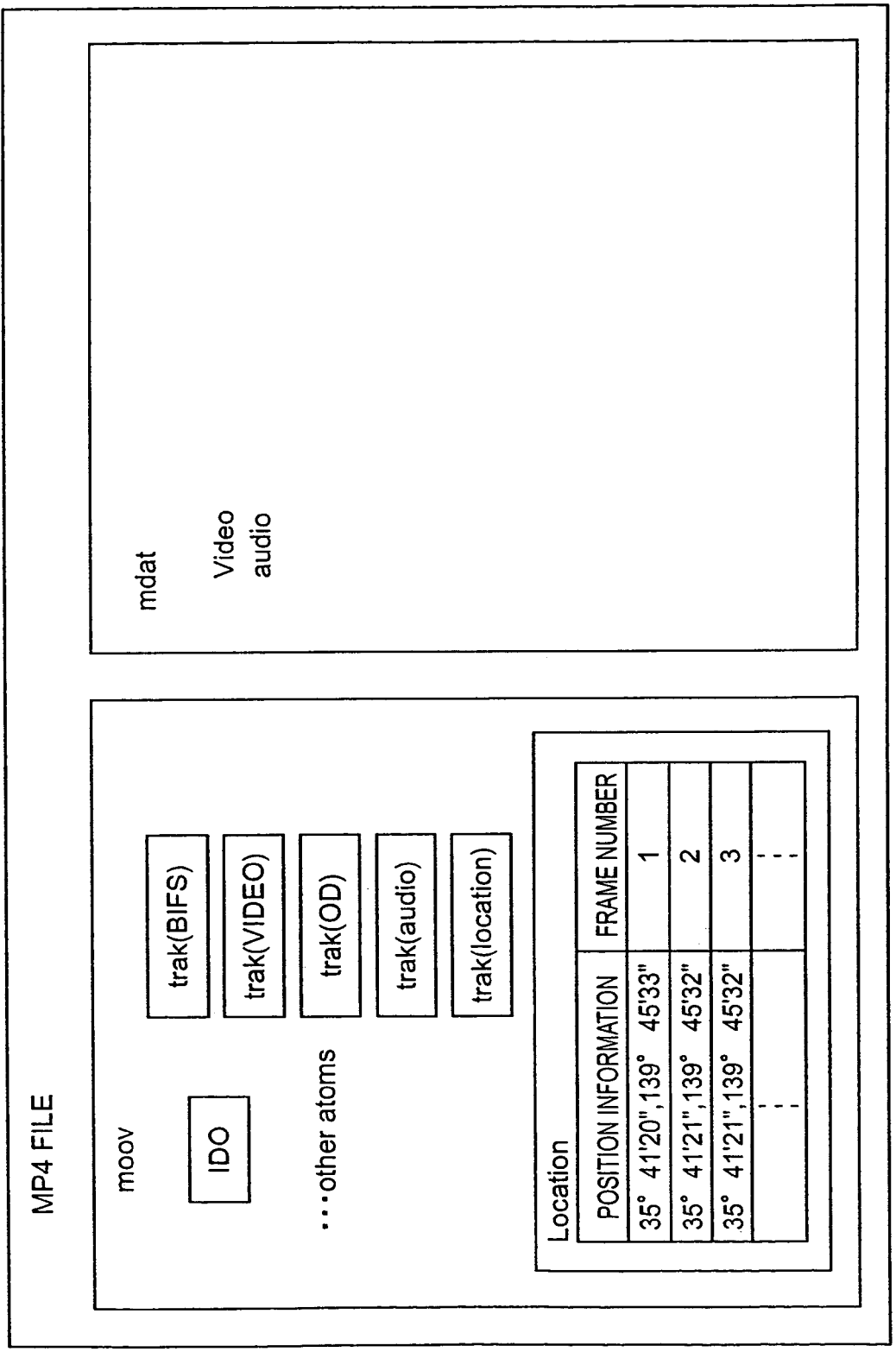
FIG. 7 is a view illustrating the structure of a MP4 file according to the embodiment.

As such a video file, a video file in the form of MPEG-4 file, for example, may be used as represented by the reference numeral 46 in FIG. 4. FIG. 6 is a view illustrating the structure of a MP4 file, which is one type of MPEG-4 file. A MP4 file is comprised of a "moov" header area, called atom, in which header information is stored and a "mdat" area in which video data, audio data and the like is stored. In this embodiment, by extending a conventional MP4 file, location information including frame numbers of the video and the above-described position information associated with the respective frame numbers can be stored in the "mdat" area, and a track (location) section indicating the area in which the location information has been stored can be constructed in the "moov" header area. Note that, as illustrated in FIG. 7 representing another MP4 file structure, the above-described location information may be stored in the "moov" header area.

Returning to FIG. 2, the radio communication section 34 transmits the video file stored in the storage section 32 to the video registration server 18 which will be explained later or other mobile communication terminals.

Next, the mobile communication terminal 6 will now be explained. The mobile communication terminal 6 is an information communication terminal, such as a cellular phone, which is carried by a user. The physical structure of the mobile communication terminal 6 is similar to that of the mobile communication terminal 4.

Figure 8:
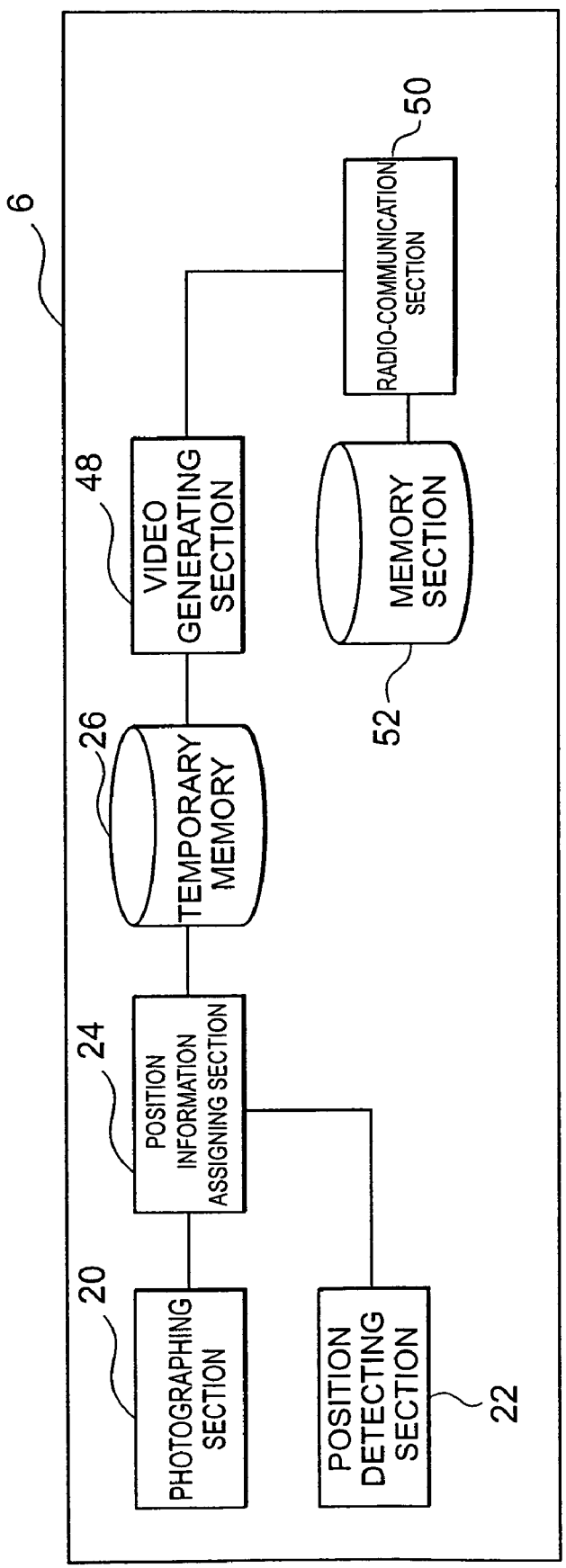
FIG. 8 is a block diagram illustrating the functional structure of a mobile communication terminal according to the embodiment.

FIG. 8 is a block diagram illustrating the functional structure of the mobile communication terminal. 6. The mobile communication terminal 8 functionally includes a photographing section (photographing means) 20, a position detecting section (position information acquiring means) 22, a position information assigning section (position information assigning means) 24, a temporary storage section 26, a video generating section (video generating means) 48, a radio-communication section (a second transmitting means and receiving means) 50 and a storage section (storage means) 52.

The photographing section 20 has a structure similar to that of the photographing section 20 of the mobile communication terminal 4 and acquires images of field at current positions of the mobile communication terminal 6. The position detecting section 22 has a structure similar to that of the position detecting section 22 of the mobile communication terminal 4 and acquires position information concerning current position of the mobile communication terminal 6.

The position information assigning section 24 has a structure similar to that of the position information assigning section 24 of the mobile communication terminal 4, and associates images acquired by the photographing section 20 with position information concerning the respective positions where the images are acquired and stores these images and the items of position information in the temporary storage section 26.

The video generating section 48 generates a video composed of a plurality of frames, each of which is an image stored in the temporary storage section 26. Each of the frames of the video is associated with the position information concerning the position where it is acquired. Among the items of position information associated with the images stored in the temporary storage section 26, the position information associated with the images, which correspond to the respective frames of the above video, is associated with the frames of the video. The video generating section 48 generates a video file by using the generated video and the items of position information associated with the respective frames of the video. As such a video file, for example, a MP4 file having the same structure as a MP4 file generated by the video generating section 30 of the mobile communication terminal 4 may be used The radio communication section 50 transmits the video file generated by the video generating section 48 to the video generating server 16. The radio communication section 50 can transmit the video file in accordance with a videophone protocol, for example. After receiving the video file, the generating server 16 adjusts the frame rate of the video as will explained later. The radio communication section 50 receives the video file including the video having frame rates set by the video generating server 16, and stores the video file in the storage section 52. The radio communication section 50 transmits the video file stored in the storage section 52 to the video registration server 18 or other mobile communication terminals.

Nest, the video generating server 16 will now be explained. The video generating server 16 adjusts the frame rate of the video in a video file transmitted from a mobile communication terminal. After adjusting the frame rate, the video generating server 16 sends back the video file including the video having adjusted frame rates, to the mobile communication terminal. The video generating server 16 is physically a computer system comprising a CPU (central processing unit), a storage device such as a storage, a storage device such as a hard disk, a communication device and other components.

Figure 9:
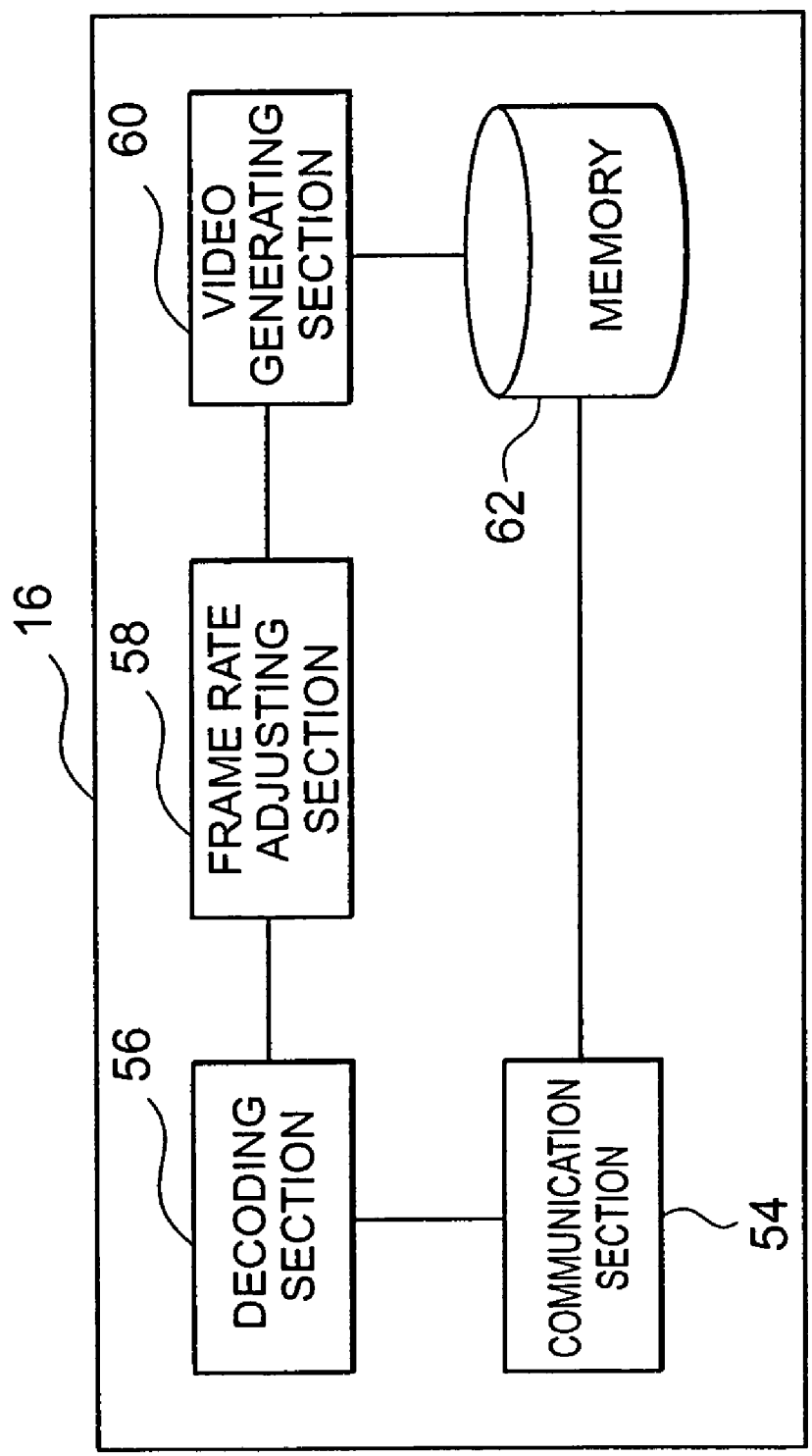
FIG. 9 is a block diagram illustrating the functional structure of the video generating server according to the embodiment.

FIG. 9 is a block diagram illustrating the functional structure of the video generating server 16. In functional term, the video generating server 16 comprises a communication section 54, a decoding section 56, a frame rate adjusting section 58, a video generating section 60 and a storage section 62.

The communication section 54 receives a video file transmitted from a mobile communication terminal. The communication section 54 also sends back to this mobile communication terminal the video file including the video having adjusted frame rates, as will be explained later.

The decoding section 56 decodes the video file, which the communication section 54 received. The frame rate adjusting section 58 adjusts the frame rate of the decoded video. This frame rate adjustment is similar to that which is executed by the frame rate adjusting section 28 of the mobile communication terminal 4.

The video generating section 60 generates a video file by using the video the frame rate of which has been adjusted by the frame rate adjusting section 58 and the items of position information associated with the respective frames of this video. Then, the video generating section 60 stores the video file in the storage section 62. This video file has a structure similar to that of a video file generated by the video generating section 30 of the mobile communication terminal 4. As described above, the communication section 54 sends back the video file stored in the storage section 62 to the mobile communication terminal.

Next, the mobile communication terminal 8 will now be explained. The mobile communication terminal 8 receives a video file transmitted from the mobile communication terminal 4 or 6 or a video file registered in the video registration server 18, and then displays a video included in this video file. The mobile communication terminal 8 has a physical structure similar to that of the mobile communication terminal 4.

Figure 10:
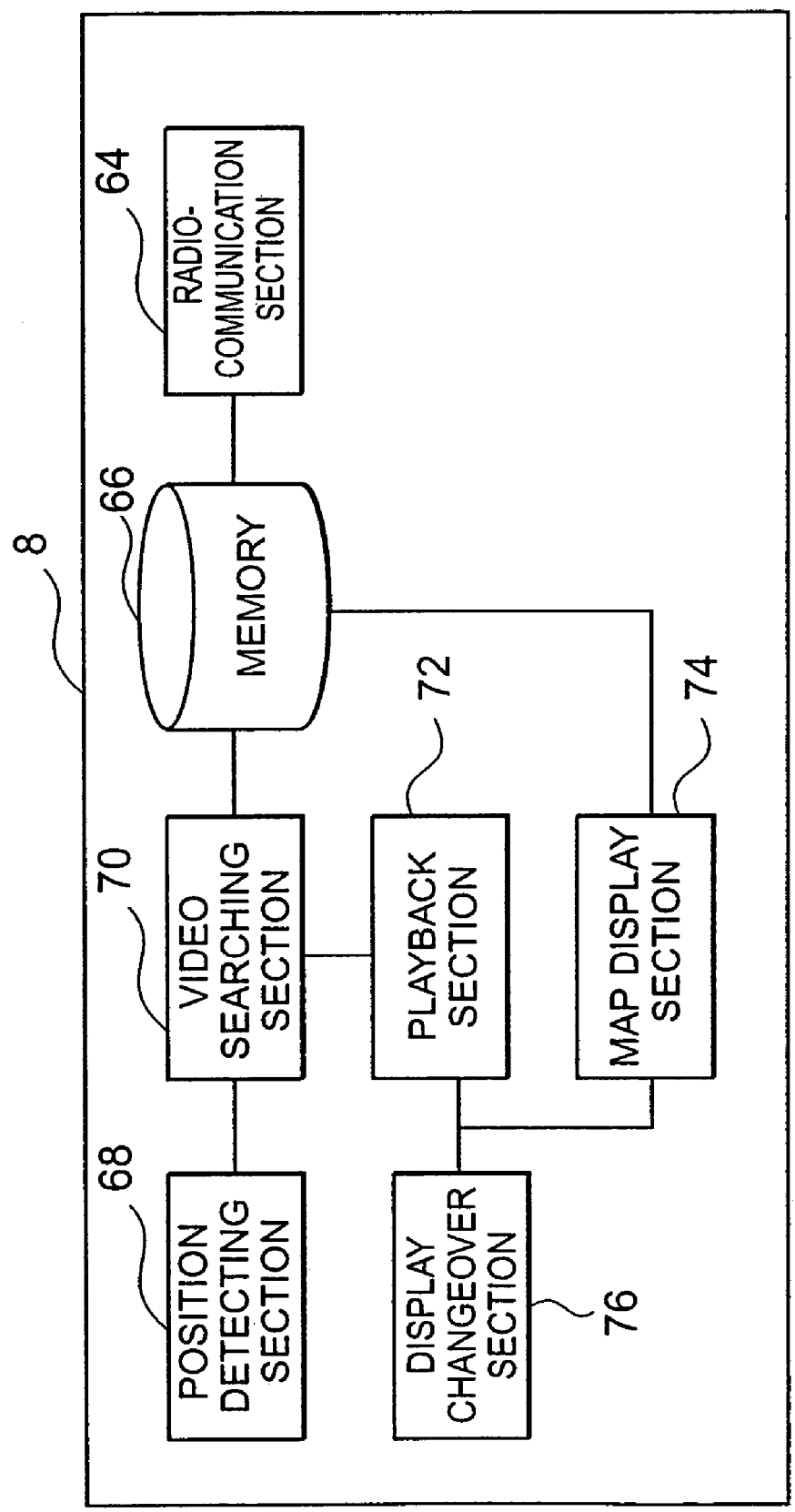
FIG. 10 is a block diagram illustrating the functional structure of a mobile communication terminal according to the embodiment.

FIG. 10 is a block diagram illustrating the functional structure of the mobile communication terminal 8. The mobile communication terminal 8 functionally comprises a radio communication section (receiving means) 64, a storage section 66, a position detecting section (position information acquiring means) 68, a video searching section (searching means), a playback section (playback means) 72, a map display section (map display means) 74 and a display changeover section 76.

The radio communication section 64 receives the above-described video file transmitted from another mobile communication terminal such as the mobile communication terminal 4 or the mobile communication terminal 6. The radio communication section 64 stores received video file in the storage section 66.

The position detecting section 68 is structured similarly to the position detecting section 22 of the mobile communication terminal 4 and acquires position information concerning current position of the mobile communication terminal 8.

The video searching section 70 compares the position information acquired by the position detecting section 68 with the position information associated with each of the frames of the video in the video files stored in the storage section 66, and specifies the frame associated with the position information which is closest to the position information acquired by the position detecting section 68.

The playback section 72 displays the frame specified by the video searching section 70, on the display device of the mobile communication terminal 8. The playback section 72 can also display a video in a playback file selected by a user of the mobile communication terminal 8, among the video files stored in the storage section 66. The playback section 72 also refers to the position information associated with each of the frames of the above video and superimposes, on a frame currently being displayed, a predetermined symbol indicating the direction of the route to the positions at which frame to be displayed later than the current frame are acquired.

The map display section 74 displays two-dimensional map information on the display device of the mobile communication terminal 8. The map display section 74 can obtain two-dimensional map information, for example, by making an access request to a server where two-dimensional information has been registered. The map display section 74 displays, on two-dimensional map information being displayed, a travel locus based on the items of position information associated with respective frames of the video being displayed by the playback section 72.

Figure 12:
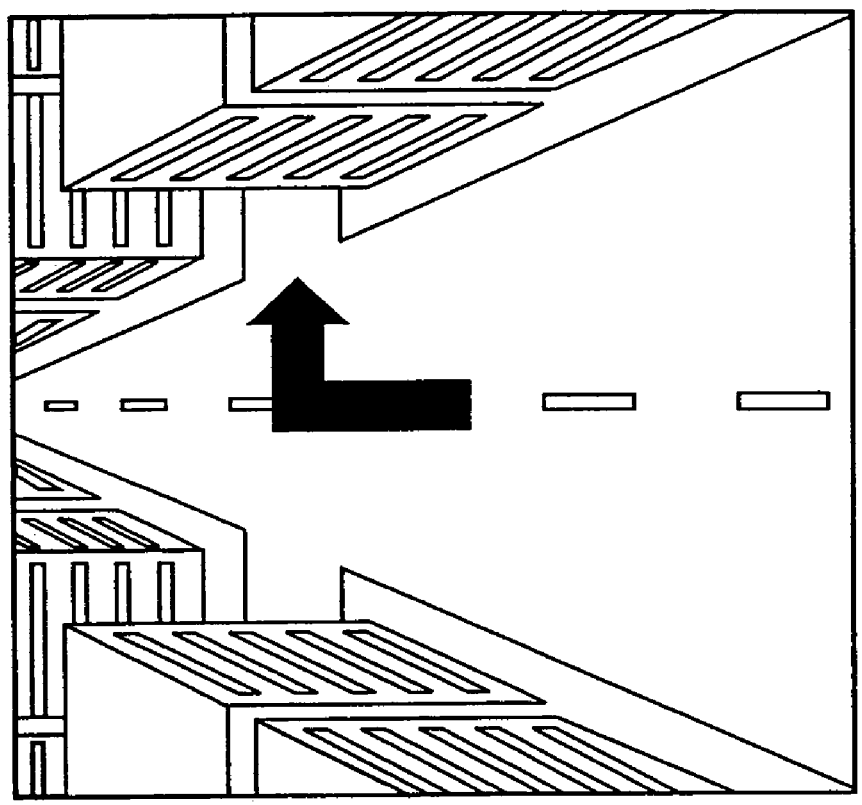
FIG. 12 is a view illustrating an example of a picture being displayed by the playback section according to the embodiment.

The display changeover section 76 switches the mode of display on the display device, between the mode of display which is provided by the playback section 72 and the mode of display, which is provided by the map display section 74. A user of the mobile communication terminal 8 selects the mode of display on the display device. The display changeover section 76 can also provide both the mode of display provided by the playback section 72 and the mode of display provided by the map display section 72 simultaneously on the display device by splitting the screen of the display device. FIG. 11 illustrates an example of picture on the screen of the display device which is provided by the playback section 72 and an example of display on the screen, which is provided by the map display section 74. The reference numeral 78 in FIG. 11 designates an example of a frame being displayed on the screen by the playback section 72 and the reference numeral 80 designates an example of a frame being displayed on the screen by the map display section 74. As shown in FIG. 11, a travel locus based on the items of position information associated with the frames is displayed by the playback section 72 is displayed on the two-dimensional map displayed by the map display section 74. FIG. 12 illustrates an example of a picture being displayed on the screen by the playback section 72. When displaying a frame of a scene around an intersection, the playback section 72 refers to the position information associated with frames of the video and if the position information associated with frames to be displayed later indicates positions lying in the direction of the other street intersecting at the intersection, displays a symbol indicating the route to the positions, as shown in FIG. 12.

Next, the mobile communication terminal 10 will now be explained. The mobile communication terminal 10 is an information communication terminal, such as a cellular phone, which is carried by a user. The mobile communication terminal 10 has a physical structure similar to that of the mobile communication terminal 4.

Figure 13:
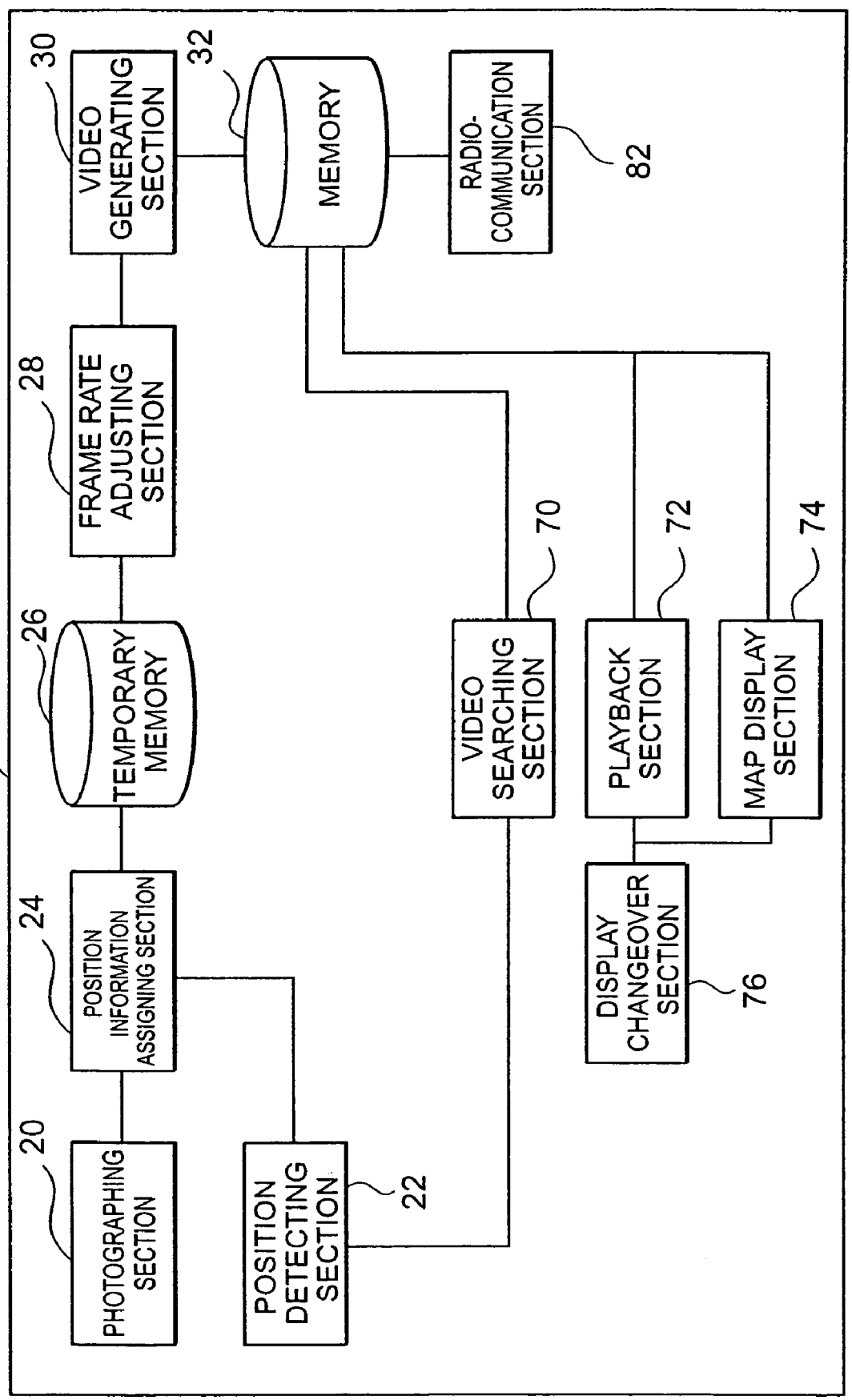
FIG. 13 is a block diagram illustrating the functional structure of a mobile communication terminal according to the embodiment.

FIG. 13 is a block diagram illustrating the functional structure of the mobile communication terminal 10. The mobile communication terminal 10 functionally includes a photographing section (photographing means) 20, a position detecting section (position information acquiring means) 22, a position information assigning section (position information assigning means) 24, a temporary storage section 26, a frame rate adjusting section (frame rate adjusting means) 28, a video generating section (video generating means) 30, a storage section (storage means) 32, a video searching section (searching means) 70, a playback section (playback means) 72, a map display section (map display means) 74, a display changeover section 76 and a radio-communication section 82.

The photographing section 20 is structured similarly to the photographing section 20 of the mobile communication terminal 4 and acquires images of field at current positions of the mobile communication terminal 6. The position detecting section 22 is structured similarly to the position detecting section 22 of the mobile communication terminal 4 and acquires position information concerning current position of the mobile communication terminal 10. The position information assigning section 24, the temporary storage section 26, the frame rate adjusting section 28, the video generating section 30 and the storage section 32 are structured similarly to the position information assigning section 24, the temporary storage section 26, the frame rate adjusting section 28, the video generating section 30 and the storage section 32, respectively, of the mobile communication terminal 4. The video searching section 70, the playback section 72, the map display section 74 and the display changeover section 76 are structured similarly to the video searching section 70, the playback section 72, the map display section 74 and the display changeover section 76, respectively, of the mobile communication terminal 8. The video searching section 70, the playback section 72 and the map display section 74 access a video file stored in the storage section 32.

The radio-communication section 82 transmits the video file stored in the storage section 32 to other mobile communication terminals or the video registration server 18. The radio-communication section 82 can also receives a video file transmitted from other mobile communication terminals or a video file registered in the registration server 18, and stores them in the storage section 32.

Next, the mobile communication terminal 12 will now be explained. The mobile communication terminal 12 is an information communication terminal, such as a cellular phone, which is carried by a user. The mobile communication terminal 12 physically comprises the same components as the mobile communication terminal 4.

Figure 14:
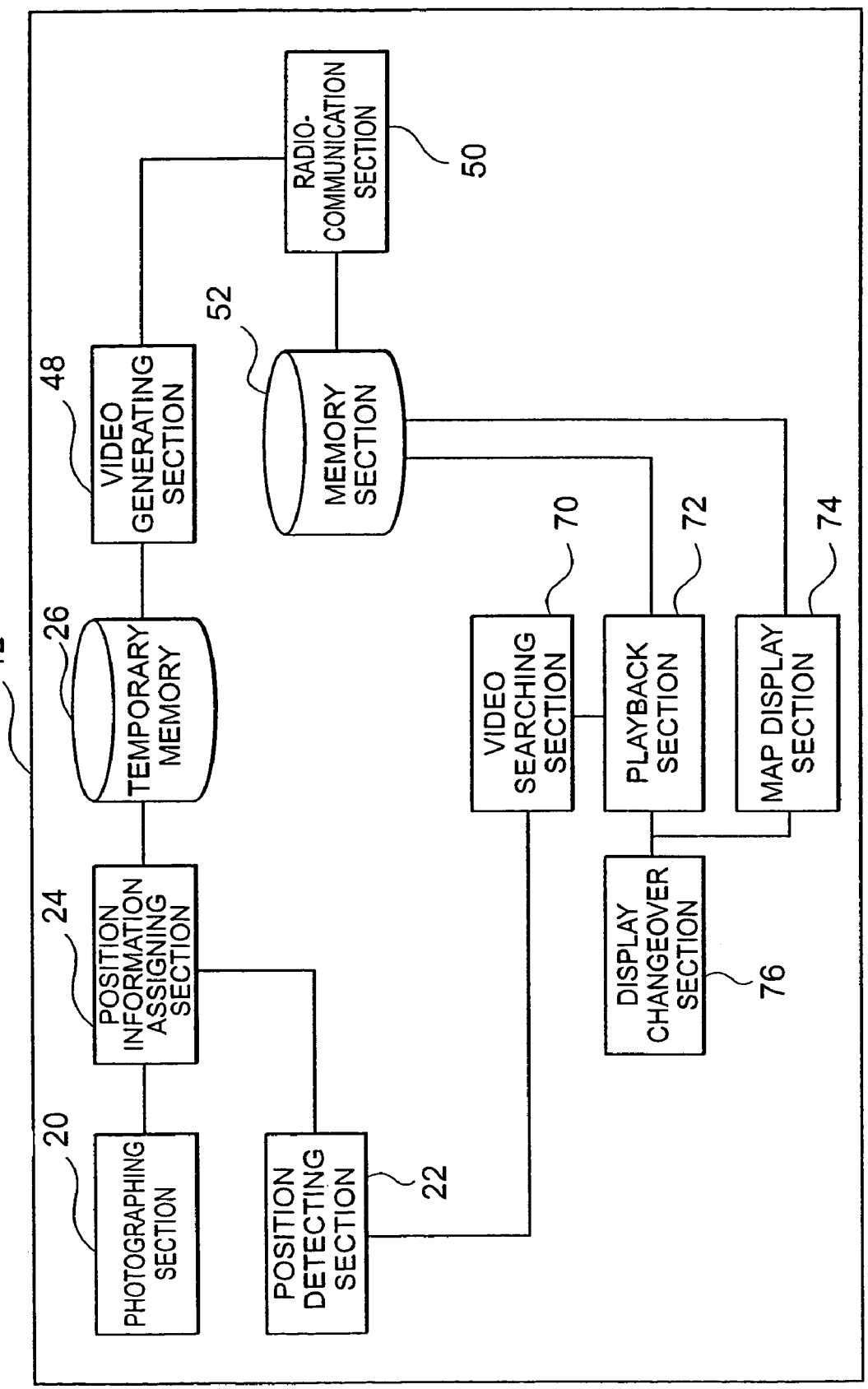
FIG. 14 is a block diagram illustrating the functional structure of a mobile communication terminal according to the embodiment.

FIG. 14 is a block view illustrating the functional structure of the mobile communication terminal 12. The mobile communication terminal 12 functionally includes a photographing section (photographing means) 20, a position detecting section (position information acquiring means) 22, a position information assigning section (position information assigning means) 24, a temporary storage section 26, a video generating section (video generating means) 48, a radio-communication section (a second transmitting means and receiving means) 50, a storage section (storage means) 52, a video searching section (searching means) 70, a playback section (playback means) 72, a map display section (map display means) 74 and a display changeover section 76.

The photographing section 20 has a structure similar to that of the photographing section 20 of the mobile communication terminal 4, and acquires images of field at current positions of the mobile communication terminal 12. The position detecting section 22 has a structure similar to that of the photographing section 20 of the mobile communication terminal 4 and acquires position information concerning current position of the mobile communication terminal 12. The position information assigning section 24, the temporary storage section 26, the video generating section 48, the radio-communication section 50, the storage section 52 are structured similarly to the position information assigning section 24, the temporary storage section 26, the video generating section 48, the radio-communication section 50, the storage section 52, respectively, of the mobile communication terminal 6. The video searching section 70, the playback section 72, the map display section 74 and the display changeover section 76 are structured similarly to the video searching section 70, the playback section 72, the map display section 74 and the display changeover section 76, respectively, of the mobile communication terminal 8. The video searching section 70, the playback section 72 and the map display section 74 access a video file stored in the storage section 52. The radio-communication section 50 may also transmit the video file stored in the storage section 52 to other mobile communication terminals or the video registration server 18. The radio-communication section 50 may also receive a video file transmitted from other mobile communication terminals or a video file registered in the registration server 18, and may store them in the storage section 32.

Next, the mail server 14 and the video registration server 18 will now be explained. The mail server 14 and the video registration server 18 physically comprise a CPU (central processing unit), a storage device such as a storage, a storage device such as a hard disk, a communication device and other components. The mail server 14 receives mails and a video file attached thereto, transmitted from the above-described mobile communication terminals, and transfers them to other mobile communication terminals which are the destinations of the mails. The video registration server 18 registers and publicizes a video file generated by the above-described mobile communication terminals. The video registration server 18, in response to an access request for a video file from a mobile communication terminal, transmits the video file to this mobile communication terminal.

Figure 15:
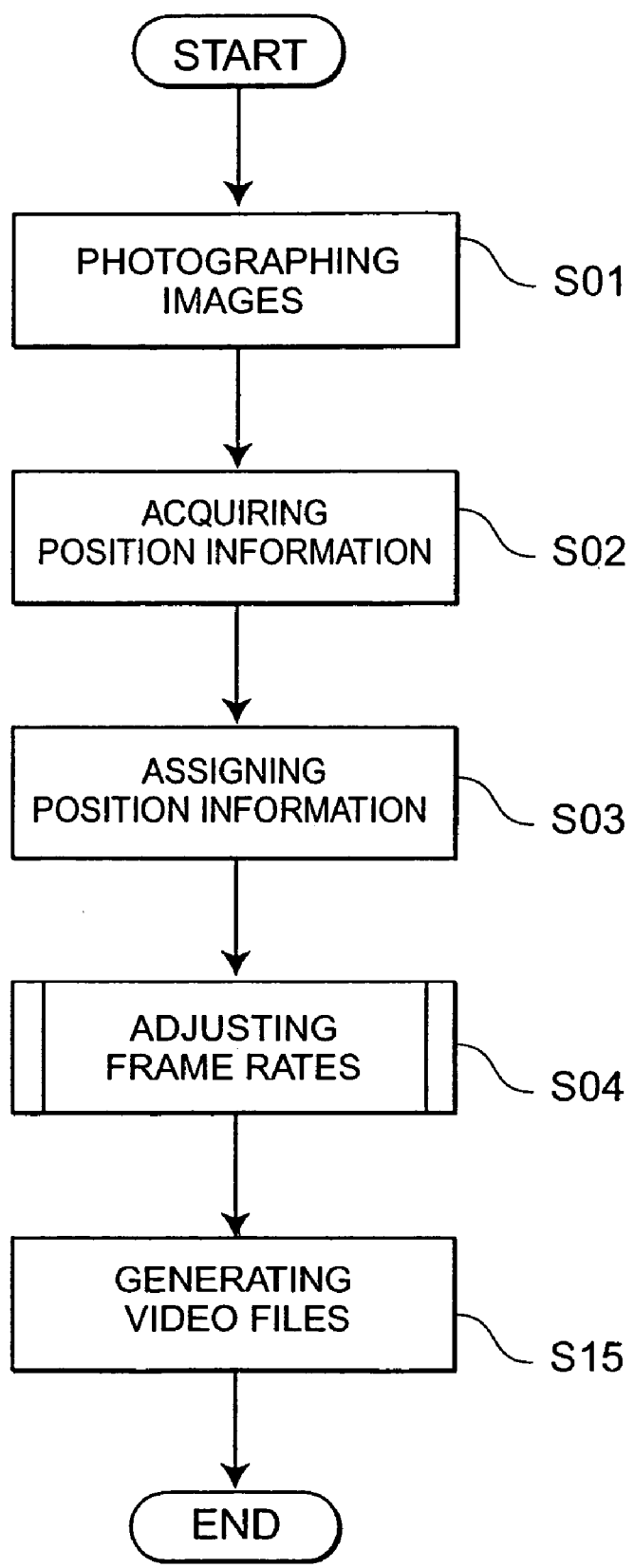
FIG. 15 is a flow chart illustrating the video file generating operation of the mobile communication terminal according to the embodiment.
Figure 16:
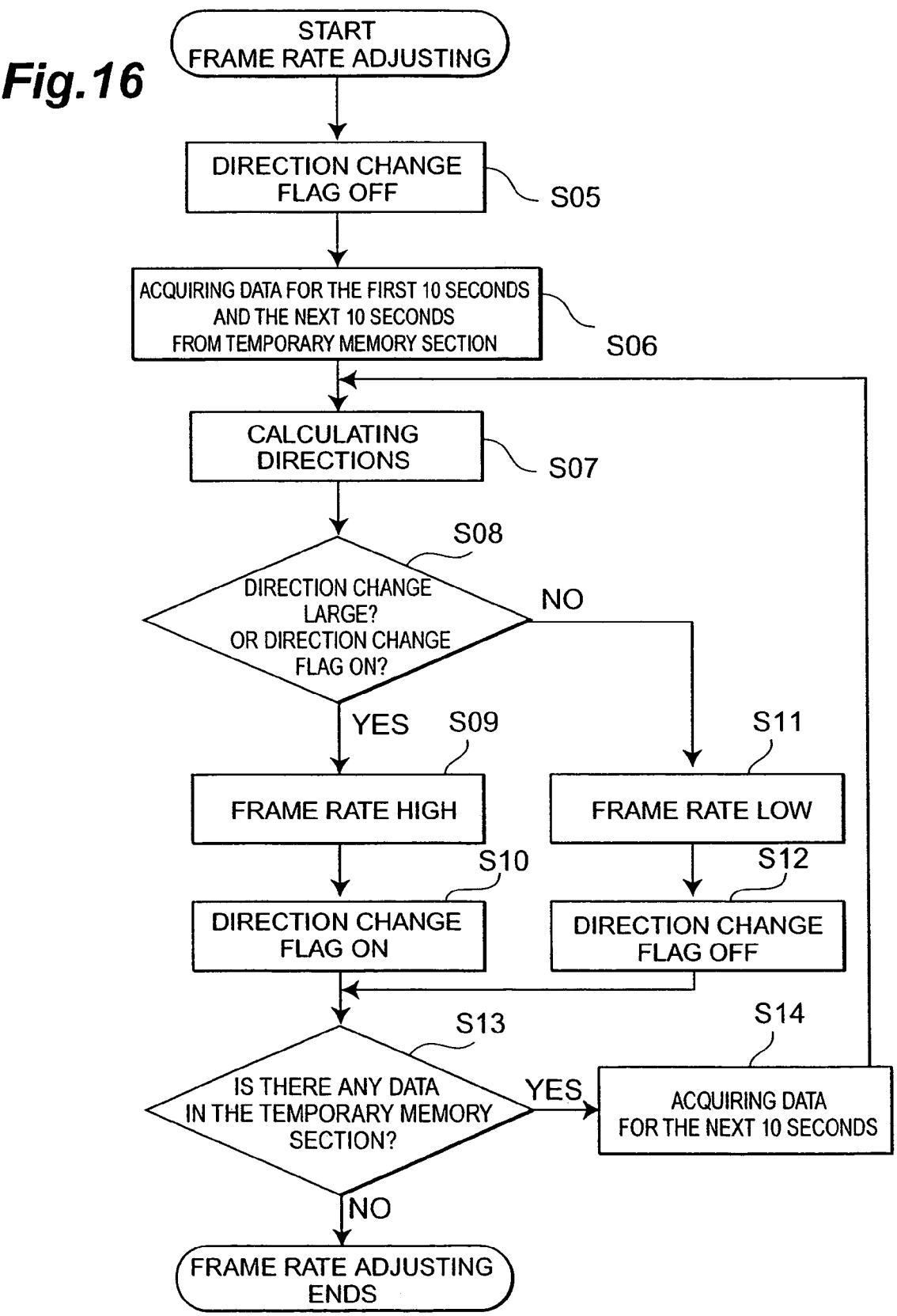
FIG. 16 is a flow chart of the frame rate adjusting process shown in FIG. 15.

Hereinafter, the operation of the mobile communication system 1 according to the present embodiment will be explained. At first, the video file generating operation of the mobile communication terminals 4 and 10 will be explained. FIG. 15 is a flow chart illustrating the video file generating operation of the mobile communication terminals 4 and 10. FIG. 16 is a flow chart of the frame rate adjusting process in the flow chart of FIG. 15.

As illustrated in FIG. 15, in the mobile communication terminals 4 and 10, the photographing section 20 acquires images of field (step S01). In parallel with this, the position detecting section 22 acquires position information (step S02). Then, the position information assigning section 24 associates each of the images with the position information concerning the position where the image is acquired, and stores the images along with the items of position information in the temporary storage section 26 (step S03). Next, the frame rate adjusting section 28 executes the frame rate adjusting process for determining the frame rate of the video to be generated from a plurality of images being stored in the temporary storage section 26 (step S04).

In the frame rate adjusting process, at first, a direction change flag is set to OFF as illustrated in FIG. 16 (step S05). This direction change flag is a flag for storing, in the case where the frame rate adjusting section 28 has determined that the previous direction change is large, the result of the determination. At the initial state, the direction change flag is set to OFF.

Then, among the images acquired during the 10 seconds from starting time of photographing, the frame rate adjusting section 28 acquires the position information associated with the first acquired image and the position information associated with the last acquired image, from the temporary storage section 26. Further, for the images acquired within the next 10 seconds, the frame rate adjusting section 28 also acquires the position information associated with the first acquired image and the position information associated with the last acquired image, from the temporary storage section 26 (step S06). Then, based on the two pieces of position information for each 10 seconds period, the frame rate adjusting section 28 derives two pieces of direction information (step S07).

Next, the angle between the two direction vectors based on the two pieces of direction information is calculated. Then, it is determined whether the direction change is large by determining whether the angle is larger than a predetermined angle, or it is determined whether the direction change flag has been set to ON (step S08). In the case where at least one of these two conditions is satisfied, the frame rate adjusting section 28 sets the frame rate to a high value (step S09), and sets the direction change flag to ON (step S10). On the other hand, if any of these two conditions are not satisfied, the frame rate adjusting section 28 set the frame rate to a low value (step S11), and sets the direction change flag to OFF (step S12). Then, it is determined whether there is still any data to be processed in the temporary storage section 26 (step S13). If there is data, the frame rate adjusting section 28 acquires the position information associated with the first acquired image and the position information associated with the last acquired image, for the images acquired within the next 10 seconds (step S14), and continues the process from step S07. On the other hand, if there is no data to be processed in the temporary storage section 26, the frame rate adjusting process ends.

Returning to FIG. 15, the video generating section 30 generates a video according to the frame rates determined by the frame rate adjusting section 28, and then generates a video file including the video and the position information associated with its frames (Step S15).

Figure 17:
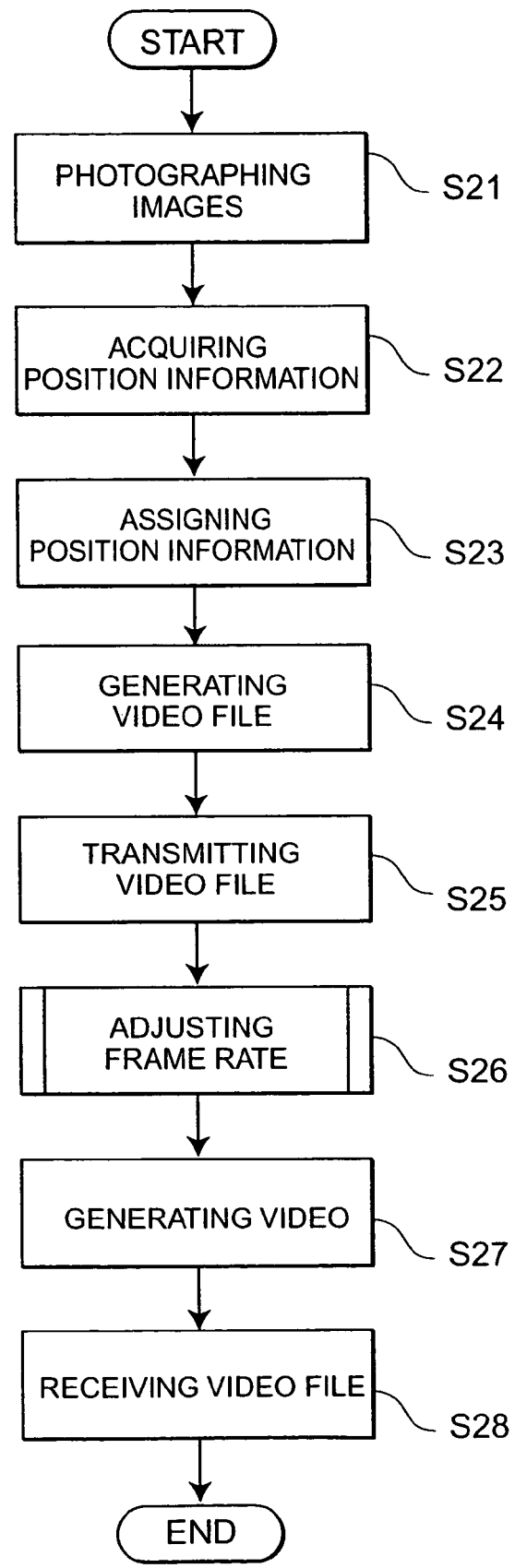
FIG. 17 is a flow chart illustrating the video file generating operation of the mobile communication terminal according to the embodiment.

Next, the video file generating operation of the mobile communication terminals 6, 12 will be explained. FIG. 17 is a flow chart illustrating the video file generating operation of the mobile communication terminals 6 and 12. As illustrated in FIG. 17, in the mobile communication terminals 6 and 12, the photographing section 20 acquires images of field (step S21). In parallel with this, the position detecting section 22 acquires position information (step S22). Then, the position information assigning section 24 associates each of the images with the position information concerning the position where the image is acquired, and stores the images along with the items of position information in the temporary storage section 26 (step S23).

Next, the video generating section 48 generates the video file using a plurality of images stored in the temporary storage section 26 (step S24) This video file is transmitted to the video generating server 16 by the radio-communication section 50 (step S25). The video generating server 16 adjusts the frame rate of the image file in the video file (step S26) and regenerates the video as a video file (step S27). The frame rate adjusting process of the video generating server 16 is similar to that of the frame rate adjusting section 28 of the mobile communication terminal 4. Then, the video generating server 16 transmits the video file generated as described above, to the radio-communication section 50. The radio-communication section 50 stores it in the storage section 52 (step S28).

Figure 18:
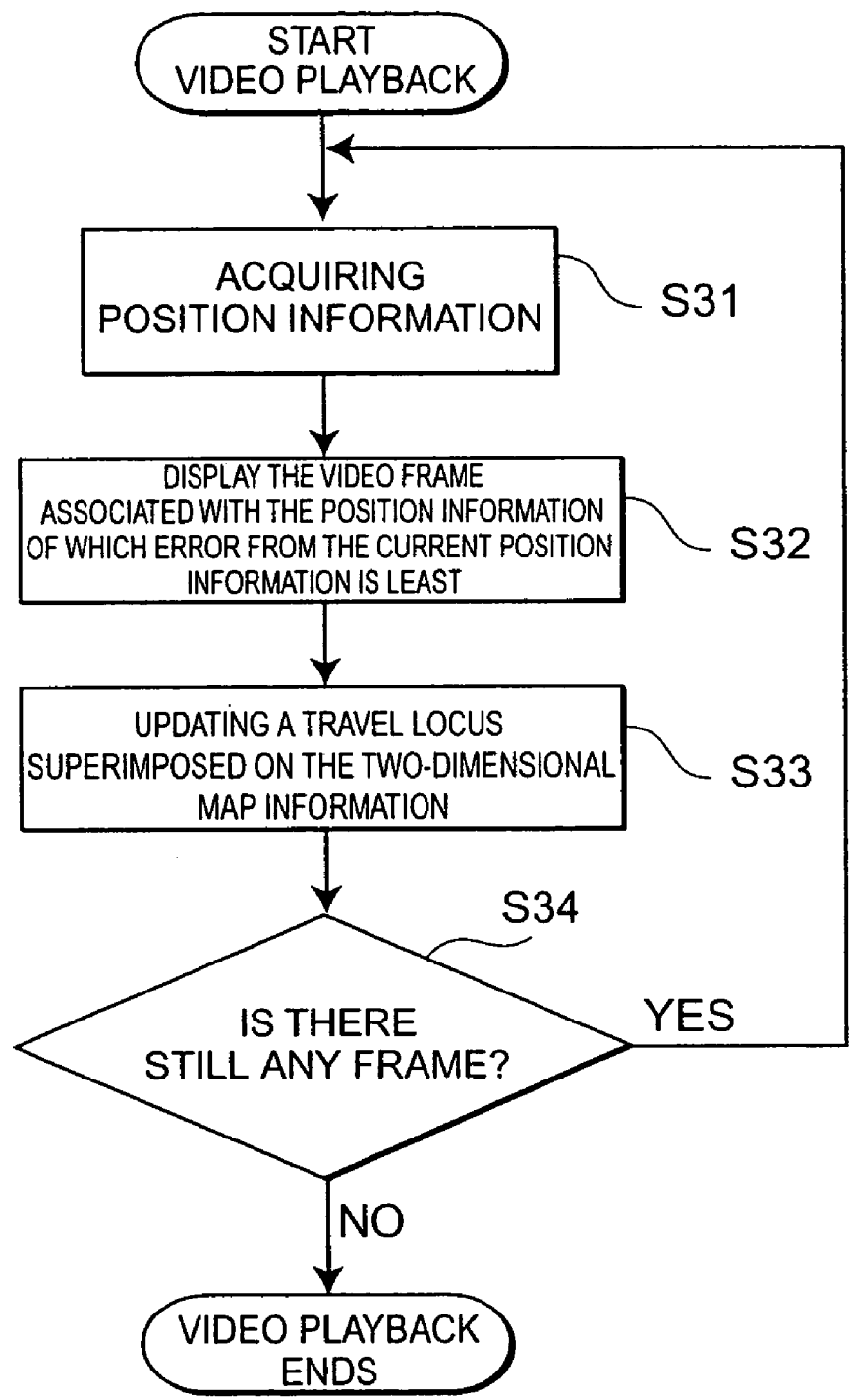
FIG. 18 is a flow chart illustrating the video file playback operation of the mobile communication terminal according to the embodiment.

Next, the video file playback operation of the mobile communication terminals 8, 10, and 12 will be explained. FIG. 18 is a flow chart illustrating the video file playback operation of the mobile communication terminals 8, 10 and 12. The explanation of the operation will be given on the basis of the assumption that there has been stored a video file in the storage sections of the mobile communication terminals 8, 10 and 12.

As illustrated in FIG. 18, at first, the position detecting section acquires position information (step S31). Then, the video searching section 70 specifies, among the items of position information associated with the respective frames of the video in the video file stored in the storage section, the position information closest to the position information acquired by the position detecting section and then specifies the frame associated with the specified position information. The playback section 74 displays the specified frame (step S32). In parallel with this, the map display section 74 displays two-dimensional map information and a travel locus superimposed thereon, which is based on the items of position information associated with the frames being displayed (step S33). Then, it is determined whether there is still any frame to be displayed by the playback section 72 (step S34). If there is no frame to be displayed by the playback section 72, this process ends. On the other hand, if there is still a frame to be displayed, the process proceeds from step S31.

Figure 19:
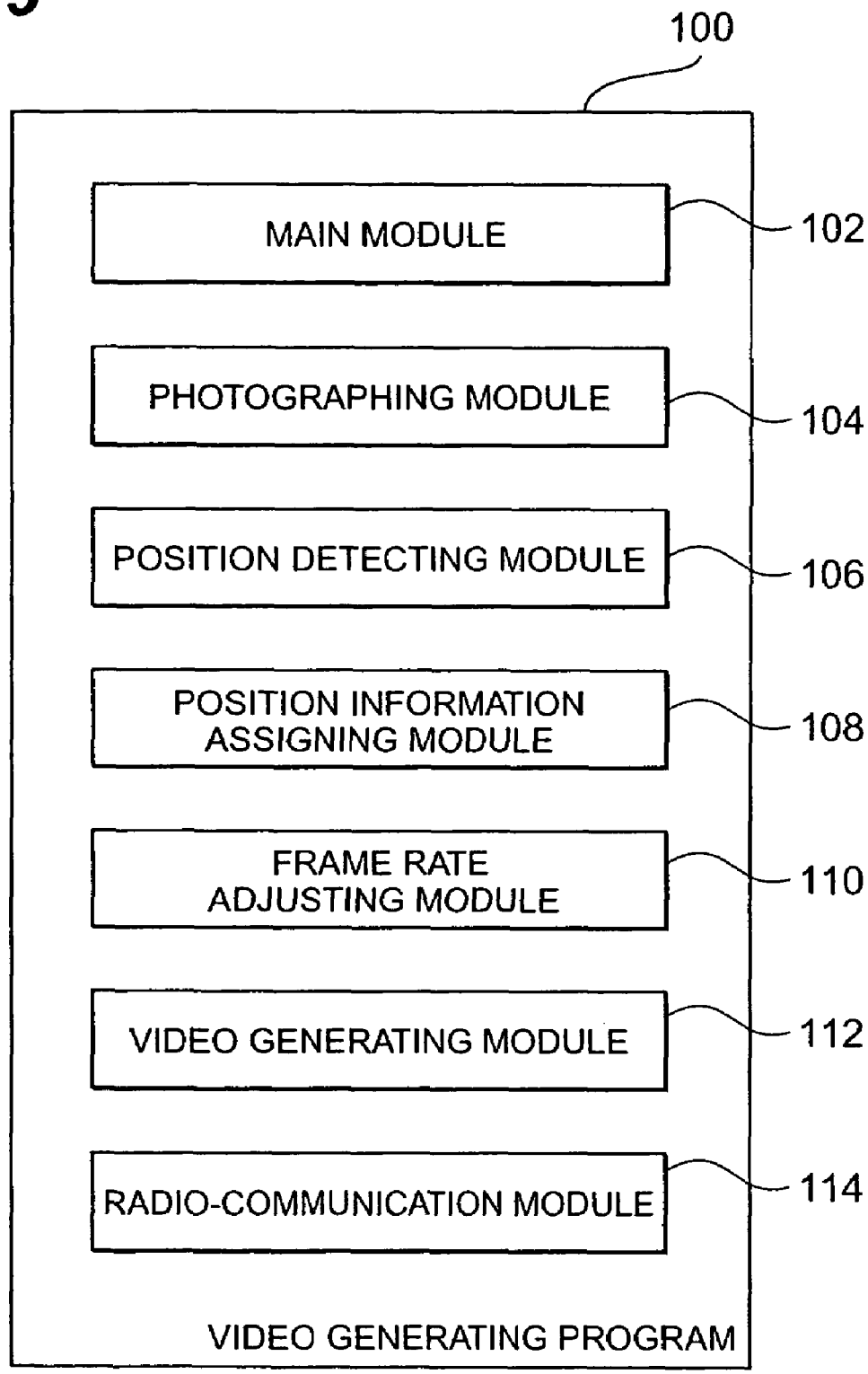
FIG. 19 is a view illustrating the structure of the video generating program according to the embodiment.

Next, the video generating program 100 for operating a mobile communication terminal as the mobile communication terminal 4 according to the present embodiment will now be explained. FIG. 19 is a view illustrating the structure of the video generating program 100. The video generating program 100 comprises a main module 102 for controlling the overall process, a photographing module 104, a position detecting module 106, a position information assigning module 108, a frame rate adjusting module 110, a video generating module 112, a radio-communication module 114. The video generating program 100 is provided, for example, by recording media such as CD-ROM, DVD, ROM, etc., or by semiconductor memories. The video generating program 100 may be a program provided as computer data signals over a carrier wave through a network. Functions that the photographing module 104, the position detecting module 106, the position information assigning module 108, the frame rate adjusting module 110, the video generating module 112 and the radio-communication module 114 make a computer execute are the same as those of the above-mentioned photographing section 20, position detecting section 22, position information assigning section 24, frame rate adjusting section 28, video generating section 30 and radio-communication section 34, respectively, of the above-described mobile communication terminal 4.

Figure 20:
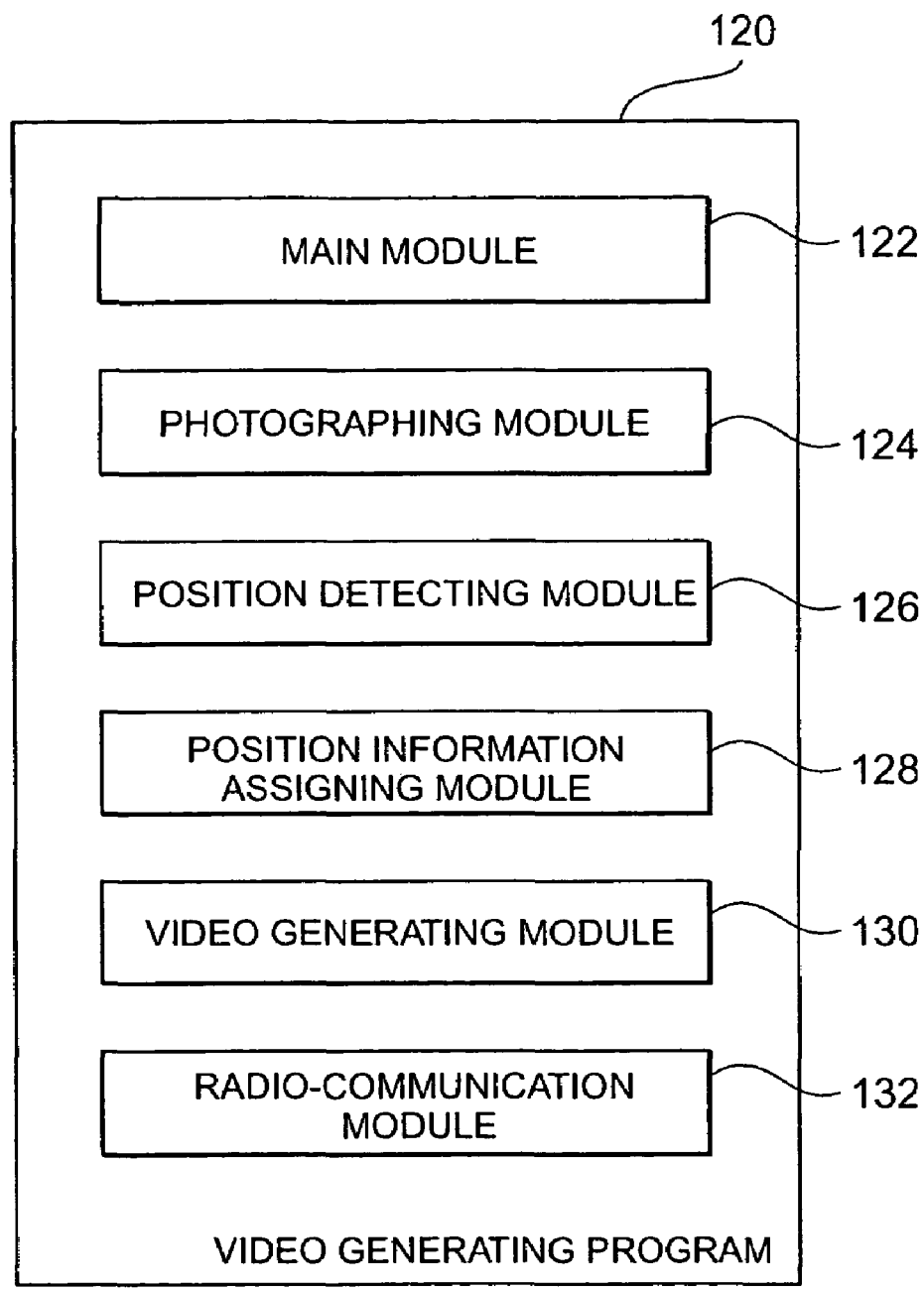
FIG. 20 is a view illustrating the structure of the video generating program according to the embodiment.

Next, the video generating program 120 for operating a mobile communication terminal as the mobile communication terminal 6 according to the present embodiment will now be explained. FIG. 20 is a view illustrating the structure of the video generating program 120. The video generating program 120 comprises a main module 122 for controlling the overall process, a photographing module 124, a position detecting module 126, a position information assigning module 128, a video generating module 130 and a radio-communication module 132. The video generating program 120 is provided, for example, by recording media such as CD-ROM, DVD, ROM, etc., or by semiconductor memories. The video generating program 120 may be a program provided as computer data signals over a carrier wave through a network. Functions that the photographing module 124, the position detecting module 126, the position information assigning module 128, the video generating module 130 and the radio-communication module 132 make a computer execute are the same as those of the above-mentioned photographing section 20, position detecting section 22, position information assigning section 24, frame rate adjusting section 28, video generating section 48 and radio-communication section 50, respectively, of the above-described mobile communication terminal 6.

Figure 21:
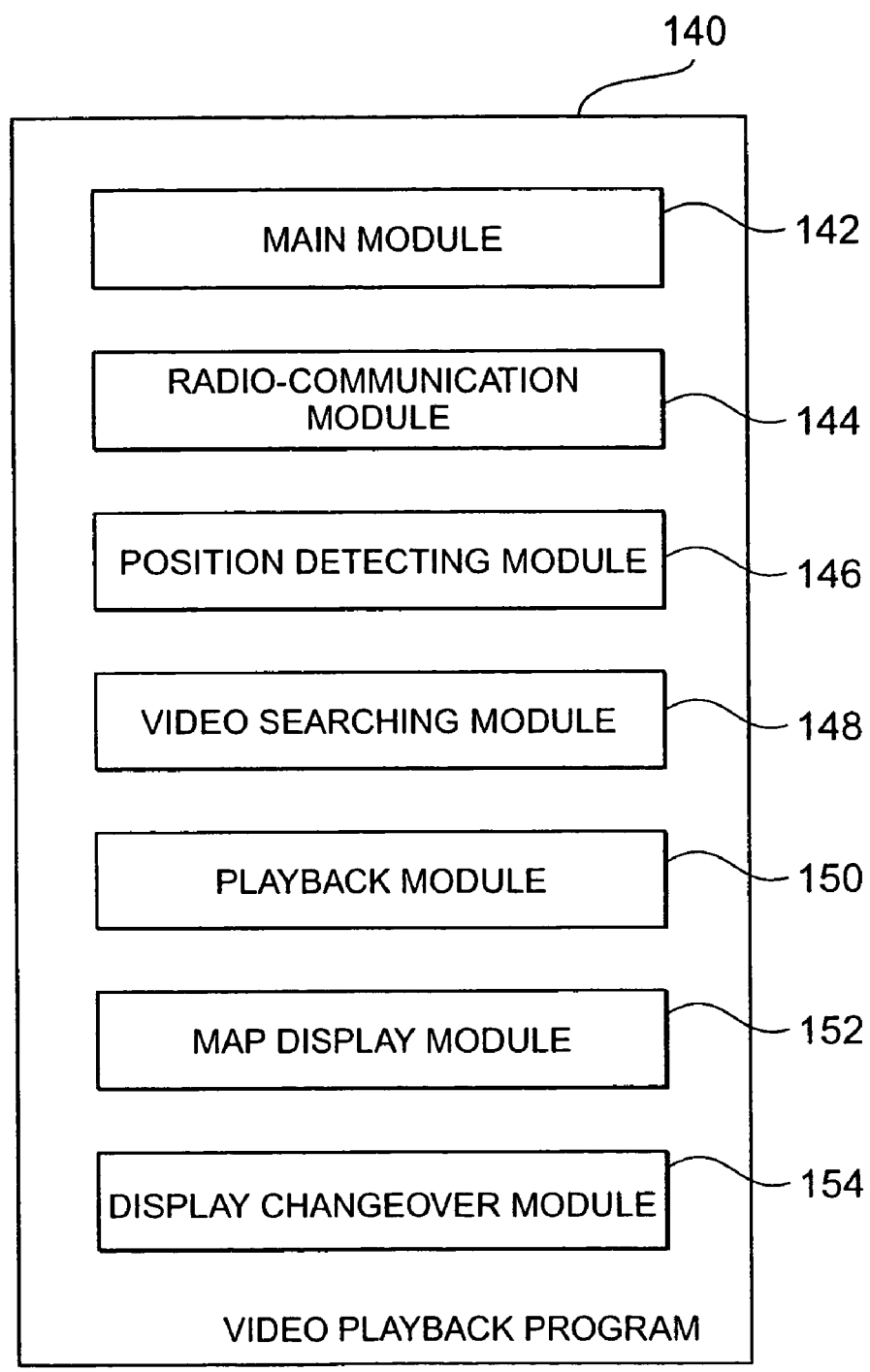
FIG. 21 is a view illustrating the structure of the video playback program according to the embodiment.

Next, the video playback program 140 for operating a mobile communication terminal as the mobile communication terminal 8 according to the present embodiment will now be explained. FIG. 21 is a view illustrating the structure of the video playback program 140. The video playback program 140 comprises a main module 142 for controlling the overall process, a radio-communication module 144, a position detecting module 146, a video searching module 148, a playback module 150, a map display module 152 and a display changeover module 154. The video playback program 140 is provided, for example, by recording media such as CD-ROM, DVD, ROM, etc., or by semiconductor memories. The video playback program 140 may be a program provided as computer data signals over a carrier wave through a network. Functions that the radio-communication module 144, the position detecting module 146, the video searching module 148, the playback module 150, the map display module 152 and the display changeover module 154 make a computer execute are the same as those of the above-mentioned radio-communication section 64, position detecting section 68, video searching section 70, playback section 72, map display section 74 and display changeover section 76, respectively, of the above-described mobile communication terminal 8.

Figure 22:
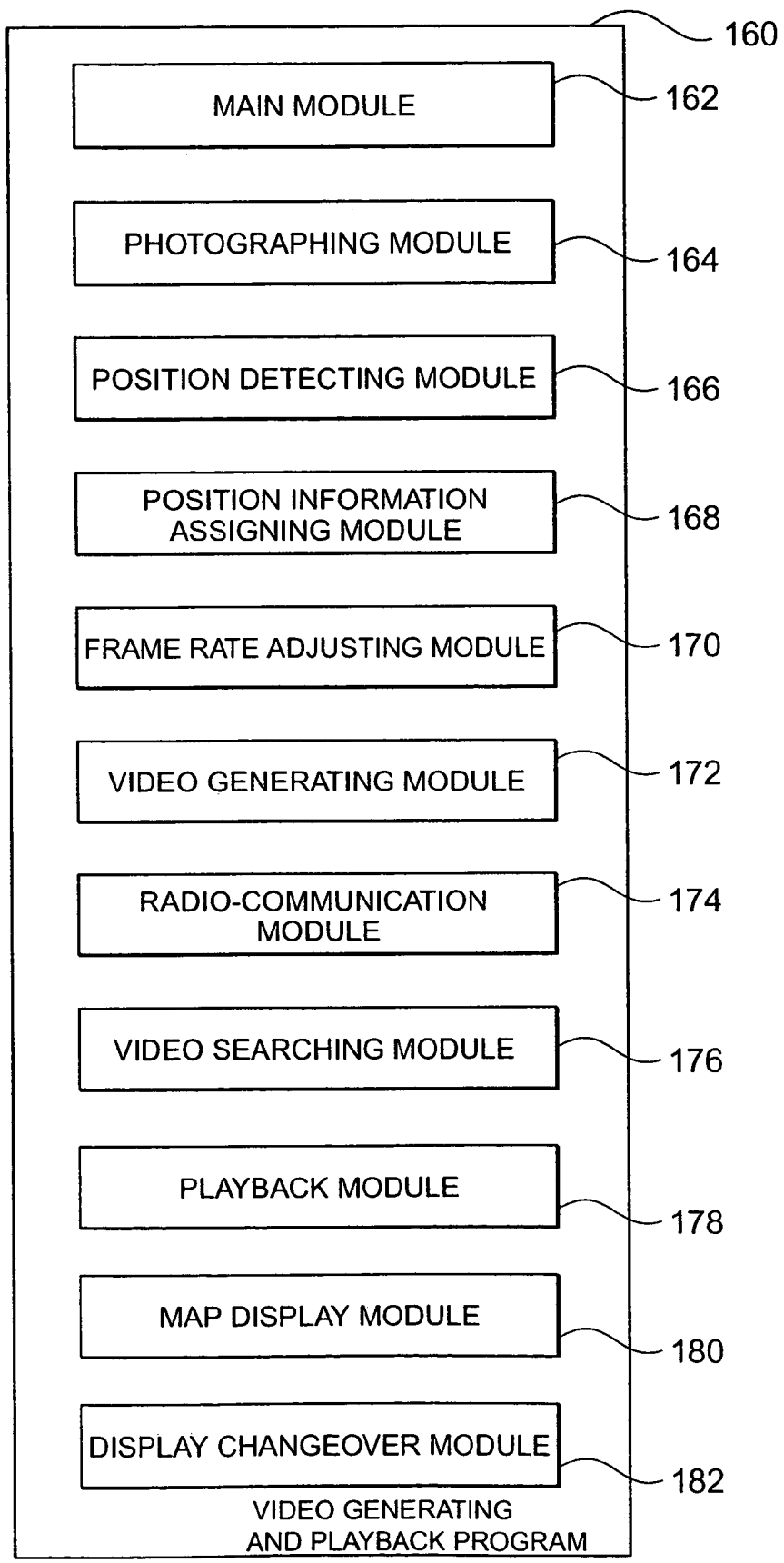
FIG. 22 is a view illustrating the structure of the video generating and playback program according to the embodiment.

Next, the video generating and playback program 160 for operating a mobile communication terminal as the mobile communication terminal 10 according to the present embodiment will now be explained. FIG. 22 is a view illustrating the structure of the video generating and playback program 160. The video generating and playback program 160 comprises a main module 162 for controlling the overall process, a photographing module 164, a position detecting module 166, a position information assigning module 168, a frame rate adjusting module 170, a video generating module 172, a radio-communication module 174, a video searching module 176, a playback module 178, a map display module 180 and a display changeover module 182. The video generating and playback program 160 is provided, for example, by recording media such as CD-ROM, DVD, ROM, etc., or by semiconductor memories. The video generating and playback program 160 may be a program provided as computer data signals over a carrier wave through a network. Functions that the photographing module 164, the position detecting module 166, the position information assigning module 168, the frame rate adjusting section 170, the video generating module 172, the radio-communication module 174, the video searching module 176, the playback module 178, the map display module 180 and the display changeover module 182 make a computer execute are the same as those of the above-mentioned photographing section 20, position detecting section 22, position information assigning section 24, frame rate adjusting section 28, video generating section 30, radio-communication section 82, video searching section 70, playback section 72, map display section 74 and display changeover section 76, respectively, of the above-described mobile communication terminal 10.

Figure 23:
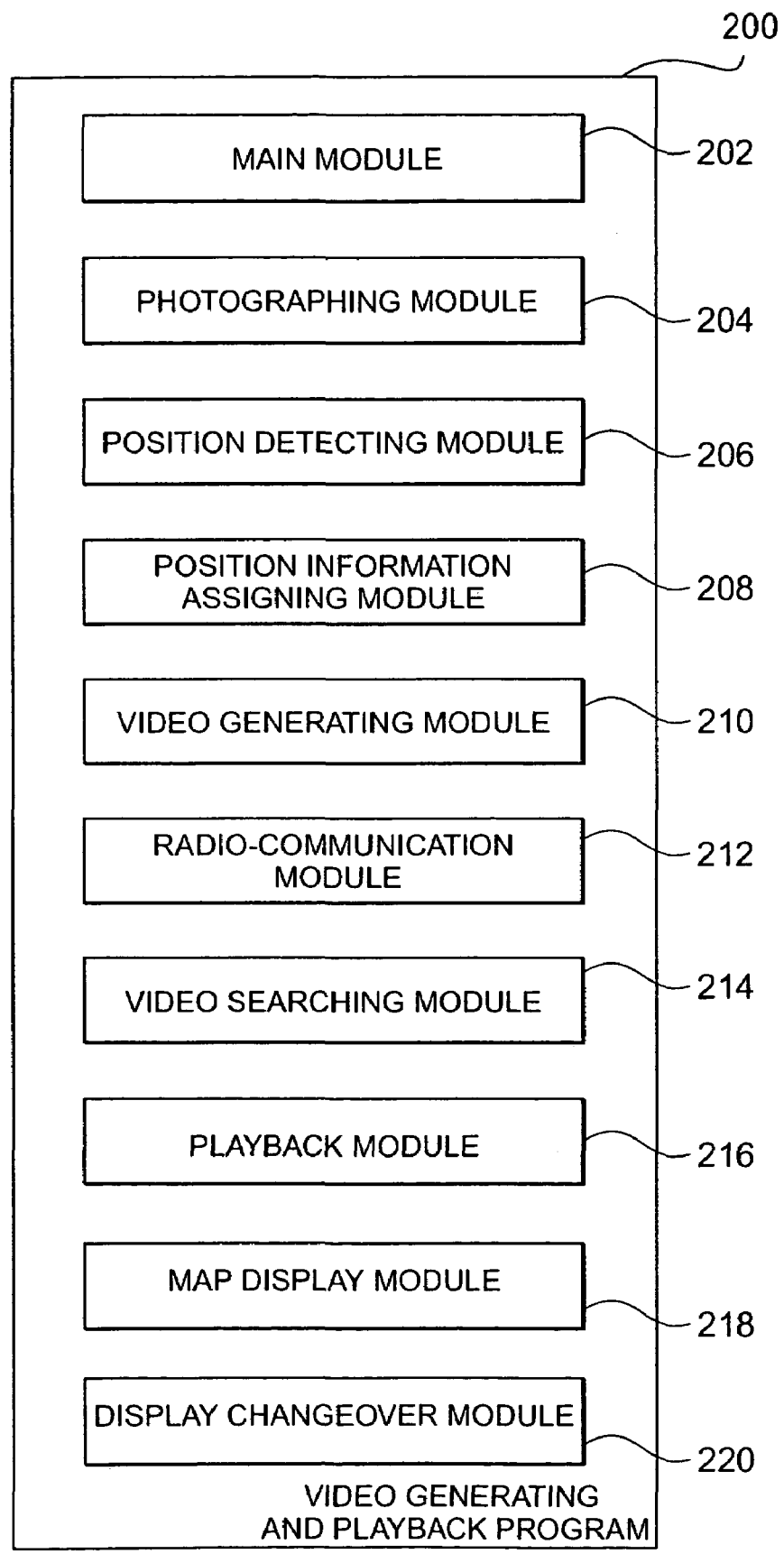
FIG. 23 is a view illustrating the structure of the video generating and playback program according to the embodiment.

Next, the video generating and playback program 200 for operating a mobile communication terminal as the mobile communication terminal 12 of the present embodiment will now be explained. FIG. 23 is a view illustrating the structure of the video generating and playback program 200. The video generating and playback program 200 comprises a main module 202 for controlling the overall process, a photographing module 204, a position detecting module 206, a position information assigning module 208, a video generating module 210, a radio-communication module 212, a video searching module 214, a playback module 216, a map display module 218 and a display changeover module 220. The video generating and playback program 200 is provided, for example, by recording media such as CD-ROM, DVD, ROM, etc., or by semiconductor memories. The video generating and playback program 200 may be a program provided as computer data signals over a carrier wave through a network. Functions that the photographing module 204, the position detecting module 206, the position information assigning module 208, the video generating module 210, the radio-communication module 212, the video searching module 214, the playback module 216, the map display module 218 and the display changeover module 220 make a computer execute are the same as those of the above-mentioned photographing section 20, position detecting section 22, position information assigning section 24, video generating section 48, radio-communication section 50, video searching section 70, playback section 72, map display section 74 and display changeover section 76, respectively, of the above-described mobile communication terminal 12.

Hereinafter, the actions and effects of the mobile communication system 1 according to the present embodiment will now be explained. In the mobile communication terminals 4, 6, 10 and 12, the photographing section 20 acquires images in a predetermined time interval, and the position information assigning section 24 associates each images with the position information concerning the position at which the image is acquired. The video generating section generates, by using a plurality of images associated with the corresponding position information, a video including frames each associated with the position information concerning the position at which the frame is acquired. Accordingly, the video generating section generates a video including frames each associated with the position information, which is little deviated from the position at which the frame is acquired. These mobile communication terminals allow for storing a video of desired routes, for example, instead of generating a map as information about the route.

In the mobile communication terminals 4 and 10, the frame rate adjusting section 28 refers to the items of position information associated with the plurality of images stored in the temporary storage section, and if there is no large change in the direction of travel locus around the positions at which some images are acquired, sets the frame rates of the video to be generated from images taken around these positions to a low value. Thus, the mobile communication terminals 4 and 10 can provide the video having a reduced frame rate for sections in which there is no large direction change and therefore no large change in scenes within the field, thereby having reduced capacities.

In the mobile communication terminals 6 and 12, a video file generated by the video generating section is transmitted to the video generating server 16. The video generating server 16 refers to the items of position information associated with the frames of the video and if there is no large change in the direction of travel locus around the positions at which some frames are acquired, reduce the number of frames taken around the positions. The mobile communication terminals 6 and 12 receive the video with adjusted frame rates. Thus, the mobile communication terminals 6 and 12 can obtain the video having a reduced frame rate for sections in which there is no large direction change and therefore no large change in scenes within the field, thereby having reduced capacity.

In the mobile communication terminals 8, 10 and 12, the playback section 72 displays a frame associated with the position information which is least deviated from the position information acquired by the position detecting section. Thus, the mobile communication terminals 8, 10 and 12 can display, at their current positions, a video, which is little different from the scenes neighboring their current positions. The mobile communication terminals according to this embodiment allow a user to walk comparing the actual scenes with the scenes of video being displayed, while a user of a terminal with a conventional navigation function has to check the current position only through map information. For example, even if there is a deviation between the position information acquired through GPS and an actual current position, the user can notice the deviation by comparing the actual scene with the scenes of video being displayed.

Further, in the mobile communication terminals 8, 10 and 12, the map display section 74 displays two-dimensional map information in synchronization with frames being displayed by the playback section 72 and also displays, on the two-dimensional map information, a travel locus based on the frames being displayed by the playback section 72. Thus, the mobile communication terminals 8, 10 and 12 can provide information concerning positions on a two-dimensional map and the images of scenes around the positions.

Further, in the mobile communication terminals 8, 10 and 12, the playback section 72 displays, by superimposing on a video, a predetermined symbol indicating the direction of travel, and therefore convenient route guidance service can be provided to the user of the mobile communication terminal.

The preferred embodiments, which have been described above, are not intended to limit the present invention, and it should be understood that various modifications might be made. For example, while the mobile communication terminals according to the above-described embodiments 4, 6, 10 and 12 generate a video with a maximum frame rate of 15 frames per second and these frames are all associated with position information, the number of frames may be reduced such that only one frame in each 0.1 second time interval is associated with position information.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

What is claimed is:

1. A mobile communication terminal comprising:
   position information acquiring means for acquiring position information;
   photographing means for acquiring images of field;
   position information assigning means for associating each of the images, which are acquired by the photographing means in a predetermined time interval, with the position information which is acquired by the position information acquiring means and specifies the position at which the image is acquired;
   video generating means for generating a video including frames each associated with the position information concerning the acquired position, based on a plurality of images which are photographed by the photographing means and include the images each associated with the position information by the position information assigning means;

storage means for storing the video generated by the video generating means and items of the position information which are associated with the frames included in the video;

transmitting means for transmitting the video and the items of position information associated with the frames included in the video, which are stored in the storage means; and frame rate adjusting means for adjusting the frame rate of the video, based on a plurality of images acquired by the photographing means including the images each associated with the position information by the position information assigning means, the frame rate adjusting means dividing the plurality of images into a plurality of groups including a predetermined number of images based on the order in which the images are acquired, determining, for each of the groups, direction information indicating the direction of a travel locus based on the position information associated with the predetermined number of images in the corresponding group, setting, for each of the groups, a frame rate for the video based on the predetermined number of images in the corresponding group to a first frame rate when a direction change amount based on the direction information determined for the corresponding group and the direction information determined for at least one of the previous group and the next group is larger than a predetermined amount and settings the frame rate to a second frame rate lower than the first frame rate when the direction change amount is equal to or smaller than the predetermined amount, wherein the video generating means generates the video using the plurality of images, according to the frame rate determined for each of the plurality of groups.

2. A mobile communication terminal comprising:

position information acquiring means for acquiring position information;

photographing means for acquiring images of field;

position information assigning means for associating each of the images, which are acquired by the photographing means in a predetermined time interval, with the position information which is acquired by the position information acquiring means and specifies the position at which the image is acquired;

video generating means for generating a video including frames each associated with the position information concerning the acquired position, based on a plurality of images which are photographed by the photographing means and include the images each associated with the position information by the position information by the position information assigning means;

storage means for storing the video generated by the video generating means and items of the position information which are associated with the frames included in the video;

searching means for specifying, among the items of position information stored in the storage means, the position information corresponding to the position information acquired by the position information acquiring means to specify the frame of the video associated with the specified position information;

playback means for displaying the frame of the video specified by the searching means; and frame rate adjusting means for adjusting the frame rate of the video, based on a plurality of images acquired by the photographing means including the images each associated with the position information by the position information assigning means, the frame rate adjusting means dividing the plurality of images into a plurality of groups including a predetermined number of images based on the order in which the images are acquired, determining, for each of the groups, direction information indicating the direction of a travel locus based on the position information associated with the predetermined number of images in the corresponding group, setting, for each of the groups, a frame rate for the video based on the predetermined number of images in the corresponding group to a first frame rate when a direction change amount based on the direction information determined for the corresponding group and the direction information determined for at least one of the previous group and the next group is larger than a predetermined amount and settings the frame rate to a second frame rate lower than the first frame rate when the direction change amount is equal to or smaller than the predetermined amount, wherein the video generating means generates the video using the plurality of images, according to the frame rate determined for each of the plurality of groups.

3. A video generating system comprising:

position information acquisition device for acquiring position information;

image acquiring device for acquiring images;

position information associating component for associating the acquired images with the acquired position information in order to specify the position at which the image is acquired;

video generator for generating a video, the video generator at least partly using information from the position information associating component in order to generate the video;

memory for storing the video generated by the video generator; and a position analyzer that analyzes the acquired images and the acquired position information in order to generate at least one aspect of the video, wherein the video generator uses the at least one aspect of the video in order to generate the video, wherein the position analyzer comprises a frame rate analyzer, wherein the at least one aspect comprises the frame rate of the video, wherein the frame rate analyzer determines a direction of the acquired images; and wherein the frame rate analyzer uses the direction of the acquired image in order to determine the frame rate of the video.

* * * * *